US012663951B2

(12) United States Patent
Hayashi et al.

(10) Patent No.: US 12,663,951 B2
(45) Date of Patent: Jun. 23, 2026

(54) IMAGE PROCESSING APPARATUS, DISPLAY SYSTEM AND IMAGE PROCESSING METHOD

(71) Applicant: SONY GROUP CORPORATION, Tokyo (JP)

(72) Inventors: Maho Hayashi, Tokyo (JP); Sachiko Nishide, Tokyo (JP); Miyuki Shirakawa, Tokyo (JP); Tomonari Murakami, Tokyo (JP); Akio Suzuki, Tokyo (JP); Asami Yamagishi, Tokyo (JP); Koji Nagata, Tokyo (JP); Seishi Tomonaga, Tokyo (JP); Tetsuo Ikeda, Tokyo (JP); Toru Nagara, Tokyo (JP); Hiroshi Takeuchi, Tokyo (JP); Takashi Takamatsu, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/904,428

(22) PCT Filed: Feb. 26, 2021

(86) PCT No.: PCT/JP2021/007265
§ 371 (c)(1),
(2) Date: Aug. 17, 2022

(87) PCT Pub. No.: WO2021/172491
PCT Pub. Date: Sep. 2, 2021

(65) Prior Publication Data
US 2023/0054104 A1 Feb. 23, 2023

(30) Foreign Application Priority Data
Feb. 28, 2020 (JP) ................................. 2020-034111

(51) Int. Cl.
| | |
|---|---|
| *G06F 3/14* | (2006.01) |
| *B60R 1/22* | (2022.01) |
| (Continued) | |

(52) U.S. Cl.
CPC .............. *G06F 3/1423* (2013.01); *B60R 1/22* (2022.01); *B60W 50/14* (2013.01); *G09G 3/001* (2013.01);
(Continued)

(58) Field of Classification Search
CPC ......... G06F 3/1423; B60R 1/22; H04N 23/90; H04N 7/181; B60W 50/14;
(Continued)

(56) References Cited

U.S. PATENT DOCUMENTS

| | | | | |
|---|---|---|---|---|
| 10,742,967 B2 * | 8/2020 | Hoggarth | ............. | H04N 9/3147 |
| 11,351,892 B1 * | 6/2022 | Roy | ......................... | G05D 1/43 |

(Continued)

FOREIGN PATENT DOCUMENTS

| | | |
|---|---|---|
| JP | 2002-328624 A | 11/2002 |
| JP | 2016-053622 A | 4/2016 |

(Continued)

OTHER PUBLICATIONS

International Search Report and Written Opinion of PCT Application No. PCT/JP2021/007265, issued on Mar. 30, 2021, 14 pages of ISRWO.

*Primary Examiner* — Asmamaw G Tarko
(74) *Attorney, Agent, or Firm* — CHIP LAW GROUP

(57) ABSTRACT

Provided is an image processing apparatus to optimize a mode of a screen for watching content. The image processing apparatus includes a shape determination unit that determines a screen shape suitable for displaying content on the basis of an automated driving state of a vehicle and information regarding the content to be displayed on a screen (Continued)

provided in the vehicle, and an image creation unit that creates an image of the content to be displayed on the screen according to the shape determined to be suitable for displaying the content by the shape determination unit.

14 Claims, 33 Drawing Sheets

(51) Int. Cl.
  *B60W 50/14* (2020.01)
  *G09G 3/00* (2006.01)
  *H04N 7/18* (2006.01)
  *H04N 23/90* (2023.01)

(52) U.S. Cl.
  CPC ............. *H04N 7/181* (2013.01); *H04N 23/90* (2023.01); *B60W 2050/146* (2013.01); *G09G 2354/00* (2013.01); *G09G 2380/10* (2013.01)

(58) Field of Classification Search
  CPC ............ B60W 2050/146; G09G 3/001; G09G 2354/00; G09G 2380/10
  USPC ........................................................ 348/148
  See application file for complete search history.

(56)                    References Cited

U.S. PATENT DOCUMENTS 11,787,288 B2 * 10/2023 Johnson ................ G06F 1/1652
                                                              345/1.1

| | | | | |
|---|---|---|---|---|
| 2010/0253494 | A1 * | 10/2010 | Inoue | G02B 27/01 |
| | | | | 340/436 |
| 2017/0013188 | A1 * | 1/2017 | Kothari | H04N 23/62 |
| 2018/0181122 | A1 * | 6/2018 | Kadoya | B60K 35/00 |
| 2019/0012985 | A1 * | 1/2019 | Narumi | B60R 11/0235 |
| 2019/0025577 | A1 * | 1/2019 | Tamura | G02B 27/0101 |
| 2019/0031102 | A1 * | 1/2019 | Kishimoto | G08G 1/16 |
| 2019/0232786 | A1 * | 8/2019 | Sasaki | G06F 3/013 |
| 2019/0243132 | A1 * | 8/2019 | Kobayashi | G02B 27/0101 |
| 2020/0183328 | A1 * | 6/2020 | Studeny | B60Q 1/0058 |
| 2020/0269726 | A1 * | 8/2020 | Ohno | B60N 2/06 |
| 2020/0312282 | A1 * | 10/2020 | Akagawa | G09G 5/377 |
| 2021/0138902 | A1 * | 5/2021 | Helot | G09G 5/30 |
| 2024/0279933 | A1 * | 8/2024 | Kume | E04D 13/0765 |

FOREIGN PATENT DOCUMENTS

| | | | |
|---|---|---|---|
| JP | 2016-215743 | A | 12/2016 |
| JP | 2017-149222 | A | 8/2017 |
| JP | 2017178131 | A | 10/2017 |
| JP | 2018106052 | A | 7/2018 |
| JP | 2018184024 | A | 11/2018 |
| JP | 2018200200 | A | 12/2018 |
| JP | 2019-009598 | A | 1/2019 |
| JP | 2019-014450 | A | 1/2019 |
| JP | 2019-018804 | A | 2/2019 |
| JP | 2019-130971 | A | 8/2019 |
| JP | 2019-137146 | A | 8/2019 |
| JP | 2020-189618 | A | 11/2020 |
| WO | 2009/072366 | A1 | 6/2009 |
| WO | 2017/130439 | A1 | 8/2017 |

* cited by examiner

Figure 25:
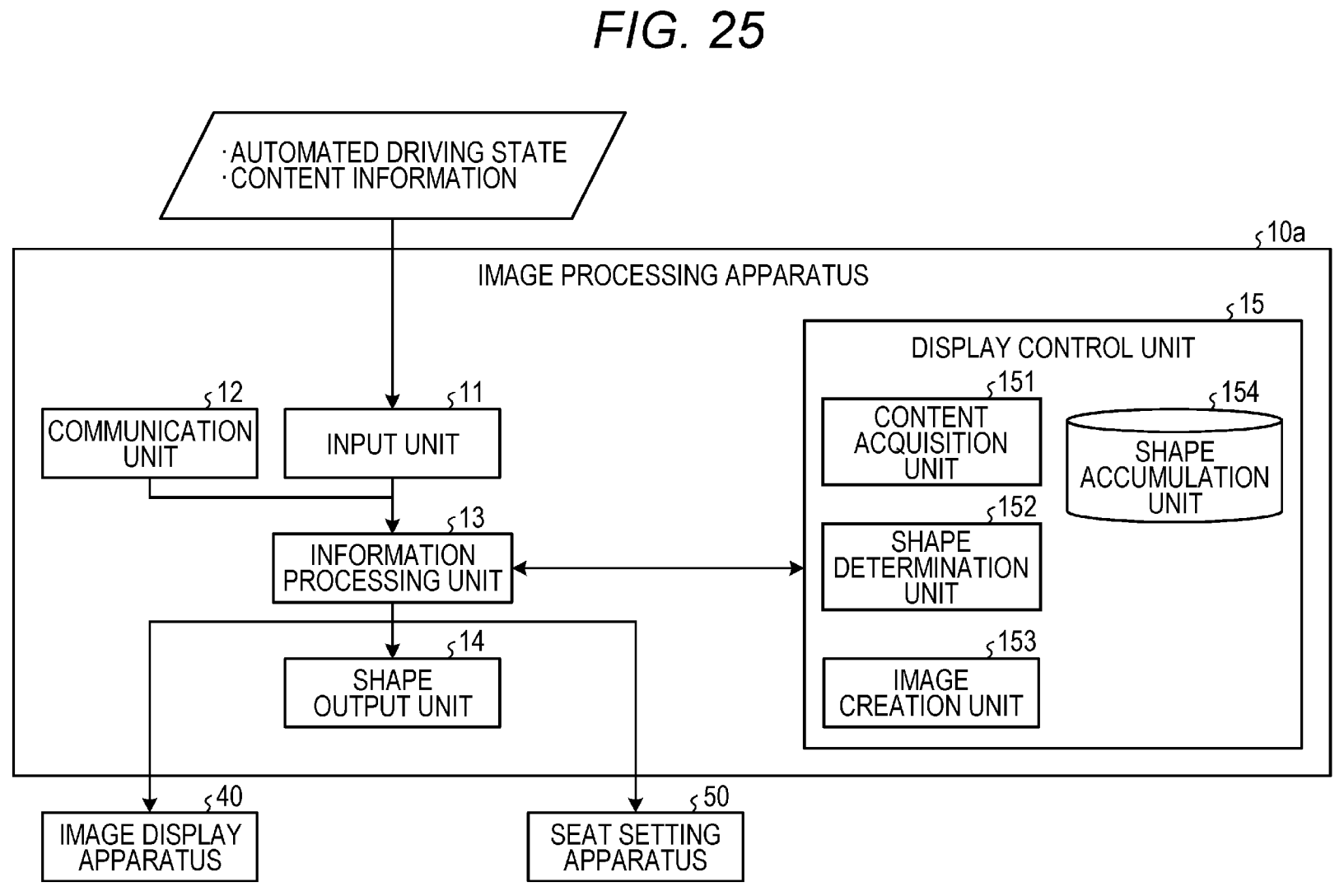

IMAGE PROCESSING APPARATUS ~10a

- AUTOMATED DRIVING STATE
- CONTENT INFORMATION

COMMUNICATION UNIT ~12

INPUT UNIT ~11

INFORMATION PROCESSING UNIT ~13

SHAPE OUTPUT UNIT ~14

DISPLAY CONTROL UNIT ~15

CONTENT ACQUISITION UNIT ~151

SHAPE DETERMINATION UNIT ~152

IMAGE CREATION UNIT ~153

SHAPE ACCUMULATION UNIT ~154

SEAT SETTING APPARATUS ~50

IMAGE DISPLAY APPARATUS ~40

IMAGE PROCESSING APPARATUS, DISPLAY SYSTEM AND IMAGE PROCESSING METHOD

CROSS REFERENCE TO RELATED APPLICATIONS

This application is a U.S. National Phase of International Patent Application No. PCT/JP2021/007265 filed on Feb. 26, 2021, which claims priority benefit of Japanese Patent Application No. JP 2020-034111 filed in the Japan Patent Office on Feb. 28, 2020. Each of the above-referenced applications is hereby incorporated herein by reference in its entirety.

TECHNICAL FIELD

The present disclosure relates to an image processing apparatus, a display system, an image processing method, and a recording medium.

BACKGROUND ART

There has been known a technology for displaying content on a screen such as an organic EL sheet installed on a ceiling in a vehicle. As an example, there has been known a technology for displaying a sky view seen from a current position on a screen. Further, as another example, there has been known a technology for displaying, on a screen, one road along which a route to a destination is directed and a position on the road.

CITATION LIST

Patent Document

Patent Document 1: Japanese Patent Application Laid-Open No. 2002-328624

SUMMARY OF THE INVENTION

Problems to be Solved by the Invention

However, the above-described conventional technology has a problem that a mode of a screen may not be suitable for viewing content. For example, it is difficult for a driver to comfortably watch content displayed on a screen above the driver's head while securing a field of view ahead.

Therefore, the present disclosure proposes an image processing apparatus, a display system, an image processing method, and a recording medium capable of optimizing a mode of a screen for watching content.

Solutions to Problems

In order to solve the above-described problem, an image processing apparatus according to an aspect of the present disclosure includes: a determination unit that determines whether or not a condition corresponding to each of a plurality of shapes of a screen is satisfied on the basis of an automated driving state of a vehicle and information regarding content to be displayed on the screen provided in the vehicle; and a screen shape output unit that outputs information specifying a shape corresponding to the condition determined to be satisfied by the determination unit.

BRIEF DESCRIPTION OF DRAWINGS

FIG. 1 is a diagram illustrating an example of a configuration of an image processing apparatus according to a first embodiment.

FIG. 25 is a diagram illustrating an example of a configuration of an image processing apparatus according to a second embodiment.

FIG. 28 is a diagram illustrating an example of a configuration of an image processing apparatus according to a third embodiment.

MODE FOR CARRYING OUT THE INVENTION

Figure 2:
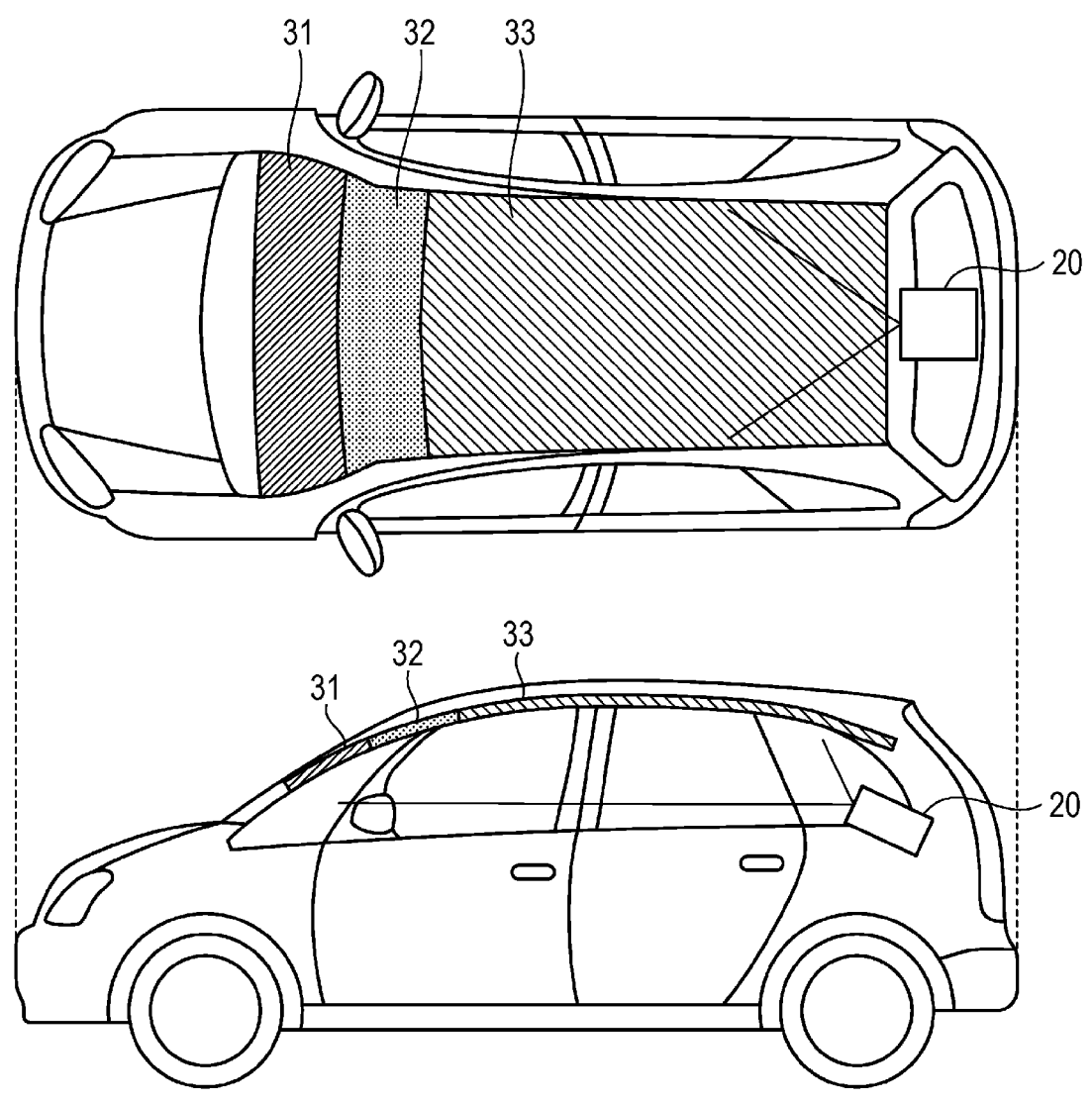
FIG. 2 is a diagram illustrating an example of a screen.

Preferred embodiments of the present disclosure will be described in detail below with reference to the accompanying drawings. Note that, in the present specification and the drawings, components having substantially the same functional configuration are denoted by the same reference sign, and overlapping description thereof will be omitted.

In addition, description will be given in the following order.

1. First Embodiment
2. Second Embodiment
3. Third Embodiment
4. Example of Application to Mobile Body

1. First Embodiment

Figure 1:
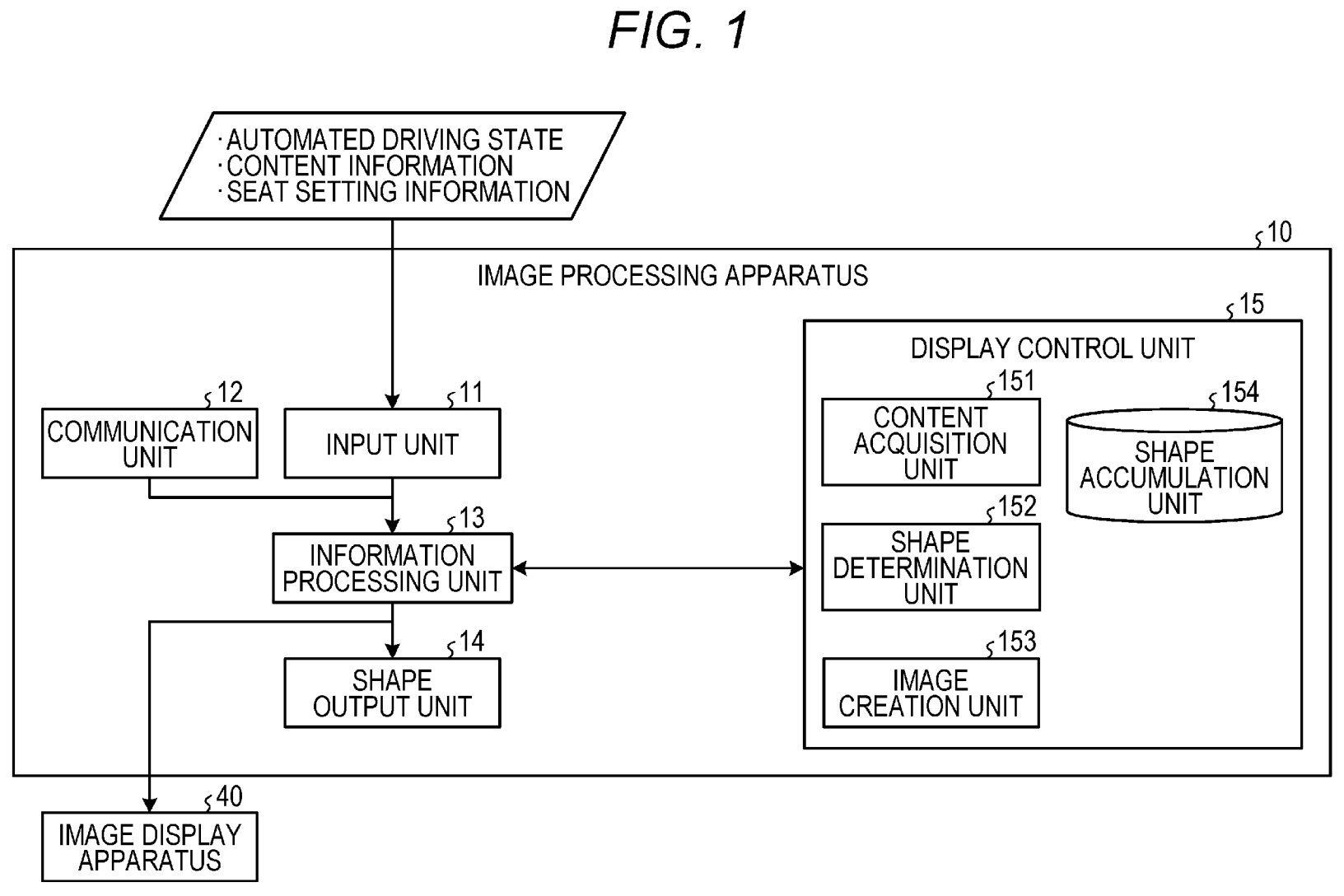

FIG. 1 is a diagram illustrating an example of a configuration of an image processing apparatus according to a first embodiment. An image processing apparatus 10 illustrated in FIG. 1 is an apparatus for performing processing related to displaying content on a screen provided in a vehicle having an automated driving function.

An input unit 11 is an input device that receives an input of a traveling status of the vehicle, a situation of an occupant, an operation by the occupant, and the like. The input unit 11 includes various sensors such as an image sensor, a depth sensor, and a touch sensor. The image sensor is a sensor that acquires a two-dimensional image, such as a visible light camera or an infrared camera. The depth sensor is a sensor that acquires three-dimensional information including a depth, such as a stereo camera or a sensor capable of performing a time of flight method, a structured light method, or the like.

Here, the input unit 11 can receive an automated driving state as a state of the vehicle. The automated driving state includes an automated driving level in addition to whether or not the vehicle is driving in an automated manner. Furthermore, the input unit 11 receives, as an operation by an occupant, an operation through a touch display, an operation by voice, a gesture operation using a skeleton field, or the like.

A communication unit 12 is an interface for performing data communication with another device. The communication unit 12 is achieved by, for example, a network interface card (NIC) or the like.

An information processing unit 13 executes each processing related to displaying content. The information processing unit 13 is achieved by, for example, a computer including a central processing unit (CPU). The information processing unit 13 performs processing for displaying an image included in the content on the basis of the information received from the input unit 11. The information processing unit 13 controls plotting of multi-contents on a window or the like for displaying applications and delivers an event such as a touch on each content. The information processing unit 13 performs processing corresponding to a control layer of a general OS.

An image display apparatus 40 displays the image included in the content. The image display apparatus 40 may include a projector and a projector screen. Alternatively, the image display apparatus 40 may be a display such as a liquid crystal display. Hereinafter, a surface on which an image is actually displayed of the projector screen, the liquid crystal display, or the like will be simply referred to as the screen.

A shape output unit 14 outputs a screen shape. Specifically, the shape output unit 14 changes the screen shape. The screen shape and the method of changing the screen shape will be described later.

A display control unit 15 determines a screen shape and creates an image to be displayed. The display control unit 15 is achieved by, for example, a computer including a CPU. As illustrated in FIG. 1, the display control unit 15 includes a content acquisition unit 151, a shape determination unit 152, an image creation unit 153, and a shape accumulation unit 154.

The content acquisition unit 151 acquires content. The content acquisition unit 151 may acquire content from a predetermined storage device, or may acquire content from an external device or another vehicle via a network.

The shape determination unit 152 determines a screen shape suitable for displaying the content on the basis of an automated driving state of the vehicle and information regarding the content to be displayed on the screen provided in the vehicle.

The image creation unit 153 creates an image of the content to be displayed on the screen according to the screen shape determined to be suitable for displaying the content by the shape determination unit 152.

Here, the screen included in the image display apparatus 40 will be described with reference to FIG. 2. FIG. 2 is a diagram illustrating an example of a screen. As illustrated in FIG. 2, the vehicle includes a lower front screen 31, an upper front screen 32, and a look-up screen 33. Each screen may be a projector screen that displays an image projected from a projector, or may be a liquid crystal display.

FIG. 2 illustrates an example of a case where the projector projects an image. As illustrated in FIG. 2, the projector 20 projects an image from a rear portion of the vehicle onto each screen. The projector 20 may be capable of changing an image projection direction and an image projection height in accordance with the screen shape. Alternatively, the projector 20 may be provided on a headrest of a driver's seat.

The lower front screen 31 and the upper front screen 32 are disposed on an inner side of a windshield. The upper front screen 32 is disposed closer to a ceiling than the lower front screen 31. In addition, the look-up screen 33 is disposed on the ceiling.

Note that although two front screens, i.e. the lower front screen 31 and the upper front screen 32, are illustrated in the example of FIG. 2, the number of front screens may be one or three or more. Further, the front screen may be provided on a sun visor.

Figure 3:
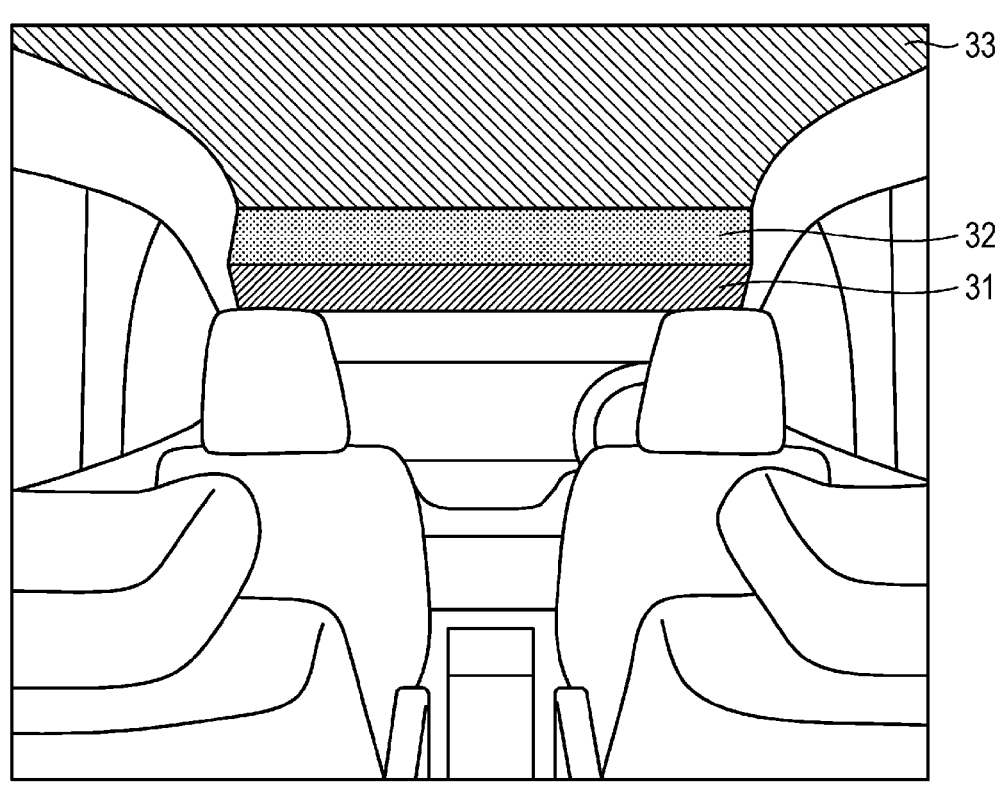
FIG. 3 is a diagram illustrating the screen viewed from a rear portion of a vehicle.

FIG. 3 is a diagram illustrating the screen viewed from a rear portion of the vehicle. As illustrated in FIG. 3, the lower front screen 31 and the upper front screen 32 block a part of the driver's field of view through the windshield.

Each screen is movable. For example, the shape output unit 14 can move each screen along the ceiling and the windshield using an actuator such as a motor as a power source. In particular, the lower front screen 31 and the upper front screen 32 move between a position visible from the occupant and a position invisible from the occupant. In addition, a state in which each screen is at a position visible from the occupant will be referred to as a taken-out state. On the other hand, a state in which each screen is at a position invisible from the occupant will be referred to as a housed state.

It is noted that in the following description, persons in the vehicle will be referred to as occupants. Further, among the occupants, a person sitting on a driver's seat is will be referred to as a driver regardless of whether or not the driver actually operates the vehicle. For example, the occupant sitting on the driver's seat when the vehicle travels by the automated driving function will also be referred to a driver even in a case where the occupant does not perform any operation.

Figure 4:
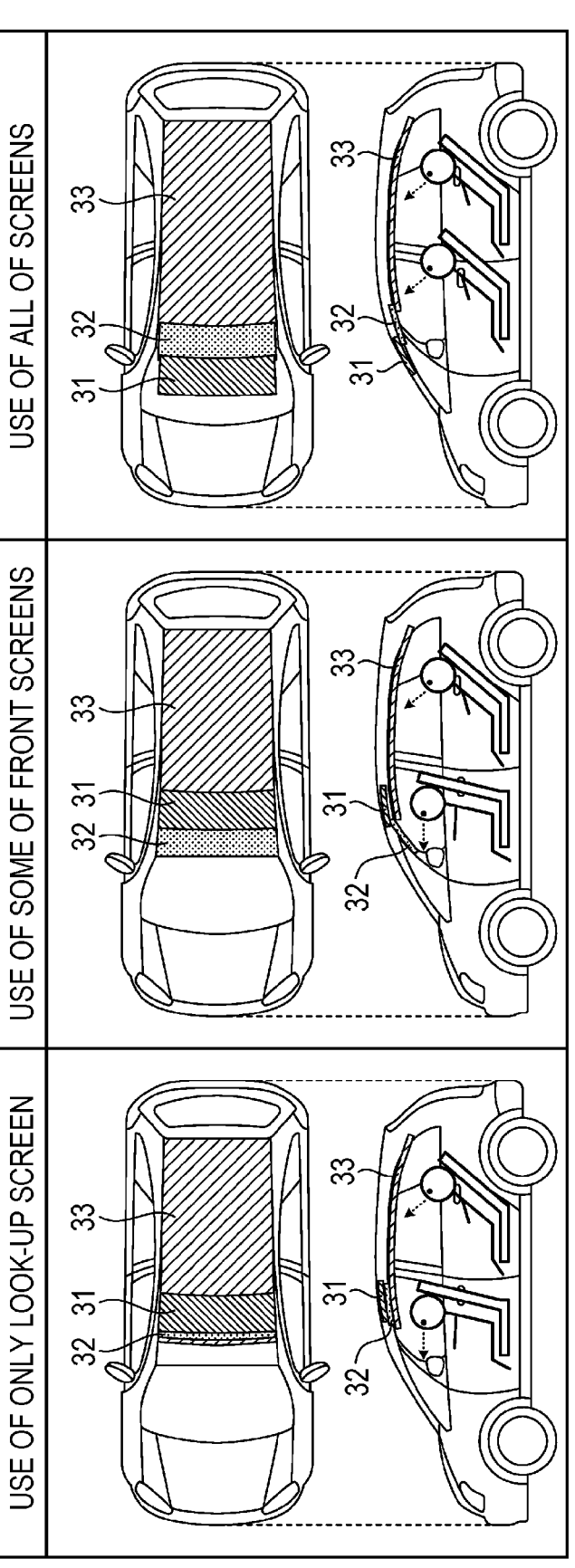
FIG. 4 is a diagram illustrating the screen shape patterns.

The arrangement of the lower front screen 31, the upper front screen 32, and the look-up screen 33 will be referred to as a screen shape. The screen shape has several patterns depending on what screens are used. FIG. 4 is a diagram illustrating the screen shape patterns. The screen shape patterns are accumulated in the shape accumulation unit 154.

First, as illustrated in FIG. 4, in a pattern in which only the look-up screen 33 is used, both the lower front screen 31 and the upper front screen 32 are in the housed state. In the example of FIG. 4, both the lower front screen 31 and the upper front screen 32 move into a gap between the look-up screen 33 and the ceiling.

Further, as illustrated in FIG. 4, in a pattern in which some of the front screens are used, the lower front screen 31 is in the housed state, and the upper front screen 32 is in the taken-out state. In the example of FIG. 4, the lower front screen 31 moves into the gap between the look-up screen 33 and the ceiling. On the other hand, the upper front screen 32 moves to a predetermined position on the inner side of the windshield.

Further, as illustrated in FIG. 4, in the pattern in which the all of the screens are used, both the lower front screen 31 and the upper front screen 32 are in the taken-out state. In the example of FIG. 4, both the lower front screen 31 and the upper front screen 32 move to respective predetermined positions on the inner side of the windshield.

The shape determination unit 152 determines one of the three patterns illustrated in FIG. 4 as an optimum pattern on the basis of predetermined conditions. In the first embodiment, the shape determination unit 152 performs the determination on the basis of at least one of an automated driving state, content information, and seat setting information.

The automated driving state indicates whether or not the vehicle is driving in the automated manner and an automated driving level. That is, the shape determination unit 152 determines a screen shape on the basis of the automated driving state including whether or not the vehicle is driving in the automated manner and the automated driving level.

The automated driving level includes a level 3 at which the system performs all driving tasks under limited conditions and the driver is expected to respond regarding a request for the intervention of the system, a level 5 at which the system performs all driving tasks, or the like. Note that the driving level mentioned here is an example.

In a case where the automated driving state is a state where the vehicle is driving in a manual manner, the shape determination unit 152 determines that a shape in which no screen is disposed on the windshield of the vehicle is suitable for displaying content. When the automated driving state is a state where the vehicle is driving in a manual manner, this means that the automated driving function does not work and the driver manually operates the vehicle. In this case, the driver may consider securing a field of view ahead for safety. Therefore, in a case where the automated driving state is a state where the vehicle is driving in a manual manner, the shape determination unit 152 determines that a shape in which both the lower front screen 31 and the upper front screen 32 are in the housed state is suitable.

In a case where the automated driving state is a state where the vehicle is driving in an automated manner, the shape determination unit 152 determines that a shape in which at least one of the plurality of screens is disposed on the windshield of the vehicle is suitable for displaying content.

Here, the higher the automated driving level, the lower frequency of times the driver is required to perform manual operations. For example, in a case where the automated driving level is 3, in a case where an obstacle that is difficult for the system to automatically avoid is detected, the driver is required to manually operate a steering wheel or a brake. On the other hand, in a case where the automated driving level is 5, the driver is not required to perform any operation.

For example, in a case where the automated driving level is 3, the shape determination unit 152 determines that a shape in which the lower front screen 31 is in the housed state and the upper front screen 32 is in the taken-out state (corresponding to the use of some of the front screens in FIG. 4) is suitable. In this case, the driver can look forward through a part of the windshield, and thus, the driver can perform an operation in a case where it is required to do so.

In addition, for example, in a case where the automated driving level is 5, the shape determination unit 152 determines that a shape in which both the lower front screen 31 and the upper front screen 32 are in the taken-out state (the use of all of the screens in FIG. 4) is suitable. In this case, the driver does not need to perform any operation, and thus, the driver can watch content using all of the screens.

Furthermore, the shape determination unit 152 determines a shape on the basis of information regarding content. For example, in a case where the size of the screen for each content to be displayed is determined in advance, the shape determination unit 152 determines a shape in accordance with the size.

Here, it is possible to assist the driver's driving by displaying, on the upper front screen 32, a car navigation system, a rearview mirror camera, an image obtained by capturing a back seat, and the like. Therefore, in a case where content for assisting the driver is displayed, the shape determination unit 152 may determine that the shape in which the upper front screen 32 is in the taken-out state (the use of some of the front screens in FIG. 4) is suitable even though the vehicle is driving in a manual manner.

Furthermore, by displaying content with all of the screens including the lower front screen 31 in the taken-out state, it is possible to improve a sense of immersion. Therefore, in a case where content requiring a sense of immersion for watching sports, planetarium, or the like is displayed, the shape determination unit 152 determines that the shape in which both the lower front screen 31 and the upper front screen 32 are in the taken-out state (the use of all of the screens in FIG. 4) is suitable.

Note that the shape determination unit 152 may perform determination based on information regarding content only in a case where the vehicle is driving in the automated manner. Furthermore, in a case where a screen shape is specified by an occupant, the shape determination unit 152 may give priority to the specified screen shape.

Furthermore, some content may include main content and information related to the main content (hereinafter referred to as metadata of content). For example, in a case where a video of a soccer game is main content, current scores of both teams may be metadata. The image creation unit 153 can determine a position at which the metadata is to be displayed according to the screen shape.

Figure 5:
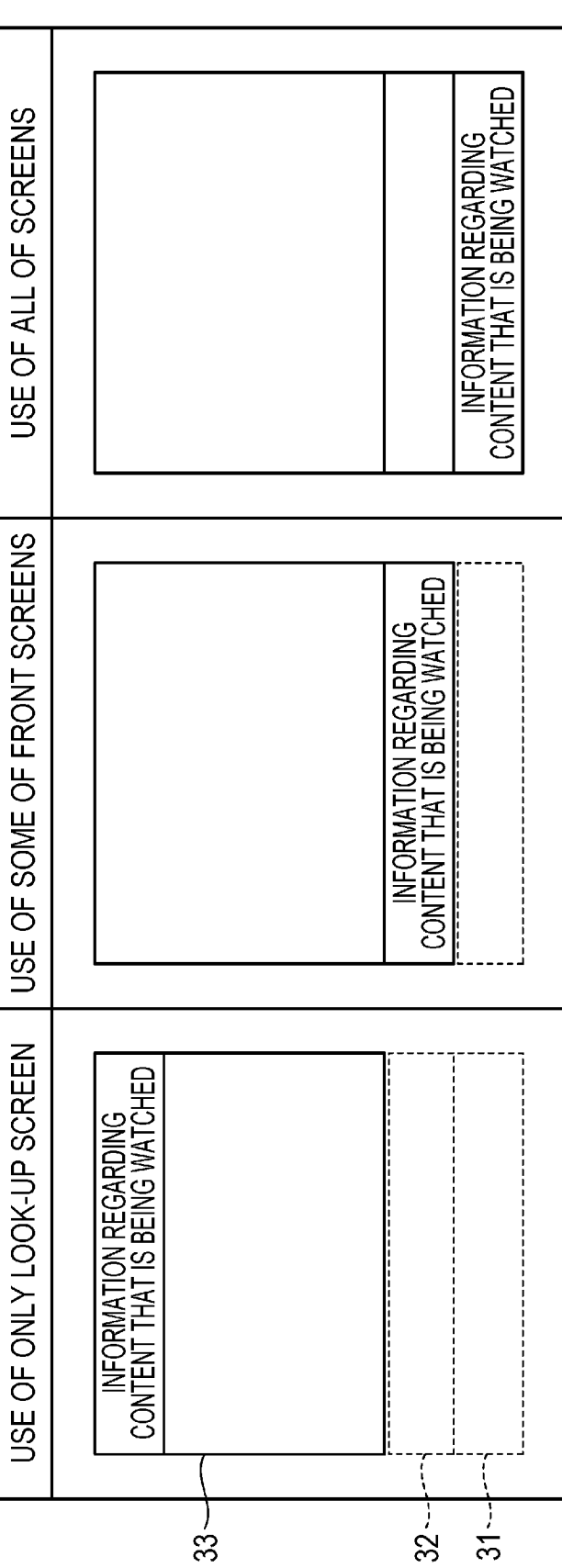
FIG. 5 is a diagram (1) illustrating metadata display patterns.

FIG. 5 is a diagram (1) illustrating metadata display patterns. A region surrounded by a solid line indicates a screen that is in use (on which an image is displayed). Furthermore, a region surrounded by a dotted line indicates a screen that is not in use (on which an image is not displayed). As illustrated in FIG. 5, in a pattern in which only the look-up screen is used, the image creation unit 153 creates an image including metadata in a partial portion thereof to be displayed on the look-up screen 33. In the pattern in which only the look-up screen is used, the lower front screen 31 and the upper front screen 32 are not used, while the look-up screen 33 is used. This is because, in the pattern in which only the look-up screen is used, it is only required that only an occupant on a back seat can watch content.

Furthermore, in a pattern in which some of the front screens are used, the image creation unit 153 creates an image including metadata to be displayed on the upper front screen 32. In the pattern in which some of the front screens are used, the lower front screen 31 is not used, while the upper front screen 32 and the look-up screen 33 are used.

Furthermore, in a pattern in which all of the screens are used, the image creation unit 153 creates an image including metadata to be displayed on the lower front screen 31. In the pattern in which all of the screens are used, the lower front screen 31, the upper front screen 32, and the look-up screen 33 are used.

Furthermore, as described above, driving assistance information may be displayed on the screen. Similarly to the metadata, the image creation unit 153 can determine a position at which the driving assistance information is to be displayed according to the screen shape. However, it may not be required to display driving assistance information depending on what the automated driving state is.

Figure 6:
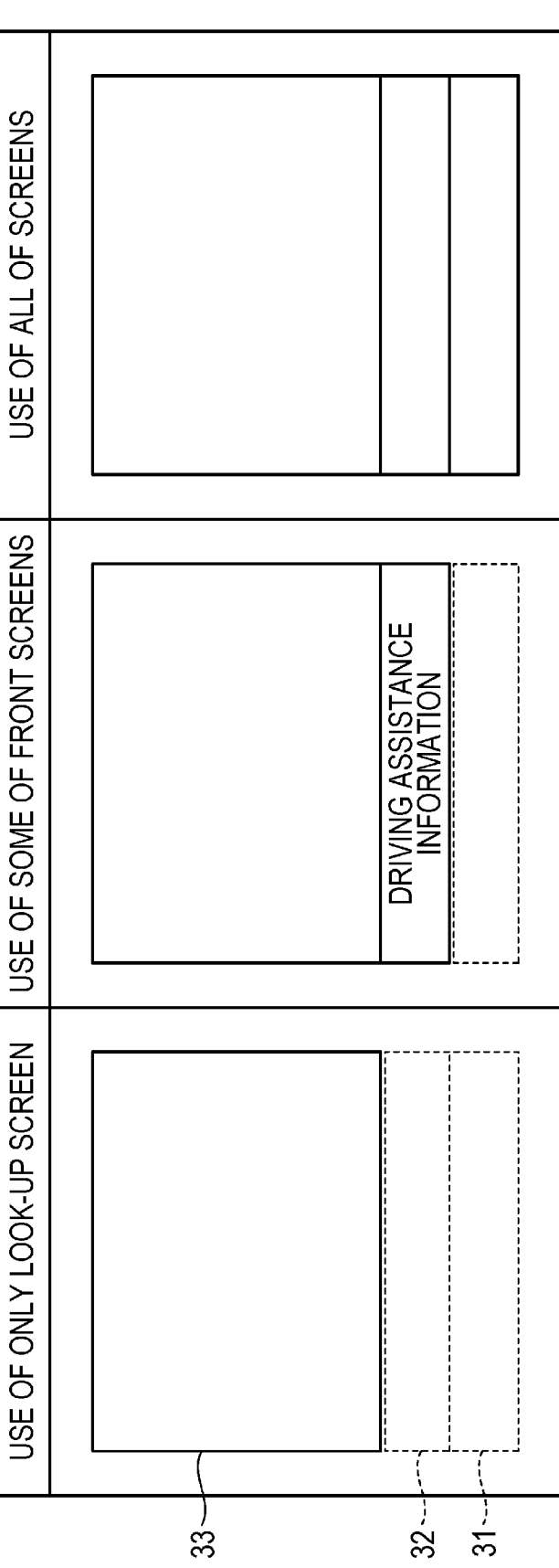
FIG. 6 is a diagram (2) illustrating metadata display patterns.

FIG. 6 is a diagram (2) illustrating metadata display patterns. A region surrounded by a solid line indicates a screen that is in use (on which an image is displayed). Furthermore, a region surrounded by a dotted line indicates a screen that is not in use (on which an image is not displayed). As illustrated in FIG. 6, in a pattern in which only the look-up screen is used, the image creation unit 153 can create an image not to display driving assistance information on the screen. In the pattern in which only the look-up screen is used, the lower front screen 31 and the upper front screen 32 are not used, while the look-up screen 33 is used. This is because it is difficult for the driver to look at the look-up screen 33 when the vehicle is driving in the manual manner.

Furthermore, in a pattern in which some of the front screens are used, the image creation unit 153 creates an image including driving assistance information to be displayed on the upper front screen 32. In this way, the image creation unit 153 creates an image indicating information for assisting driving, as an image to be displayed on a screen disposed on the windshield of the vehicle among the plurality of screens. In the pattern in which some of the front screens are used, the lower front screen 31 is not used, while the upper front screen 32 and the look-up screen 33 are used. Therefore, while the vehicle is driving in the automated manner, the driver can perform manual driving in a case where it is required to perform an operation by checking information on the upper front screen 32.

Furthermore, in a pattern in which all of the screens are used, the image creation unit 153 creates an image including no driving assistance information to be displayed on the screens. In the pattern in which all of the screens are used, the lower front screen 31, the upper front screen 32, and the look-up screen 33 are used. This corresponds to the above-described case where the automated driving level is 5, and for this reason, the driver does not perform manual driving.

The shape determination unit 152 determines a screen shape suitable for displaying content on the basis of an automated driving state, information regarding the content, and an inclination of a backrest of a seat in the vehicle. For example, in a case where the seat of the vehicle is inclined to a degree unsuitable for driving, the shape determination unit 152 determines that a shape in which some of the screens are disposed on the windshield of the vehicle is suitable for displaying content. The driver may consider tilting the backrest of the seat to look up the look-up screen.

As an inclination unsuitable for driving, an angle may be determined in advance. For example, in a case where the backrest of the seat is inclined at 30 degrees or more, the shape determination unit 152 may determine that the backrest of the seat is inclined to a degree unsuitable for driving. Furthermore, the angle of the backrest of the seat is recorded in a case where the vehicle is driving in the manual manner, and in a case where a calculated inclination of the backrest of the seat exceeds a predetermined range from the recorded angle, the shape determination unit 152 determines that the backrest of the seat is inclined to a degree unsuitable for driving. Note that the inclination of the backrest of the seat is detected from a state of an inclination adjustment mechanism of the backrest. Alternatively, the inclination of the backrest may be measured by an inclination measuring sensor provided on the backrest.

Figure 7:
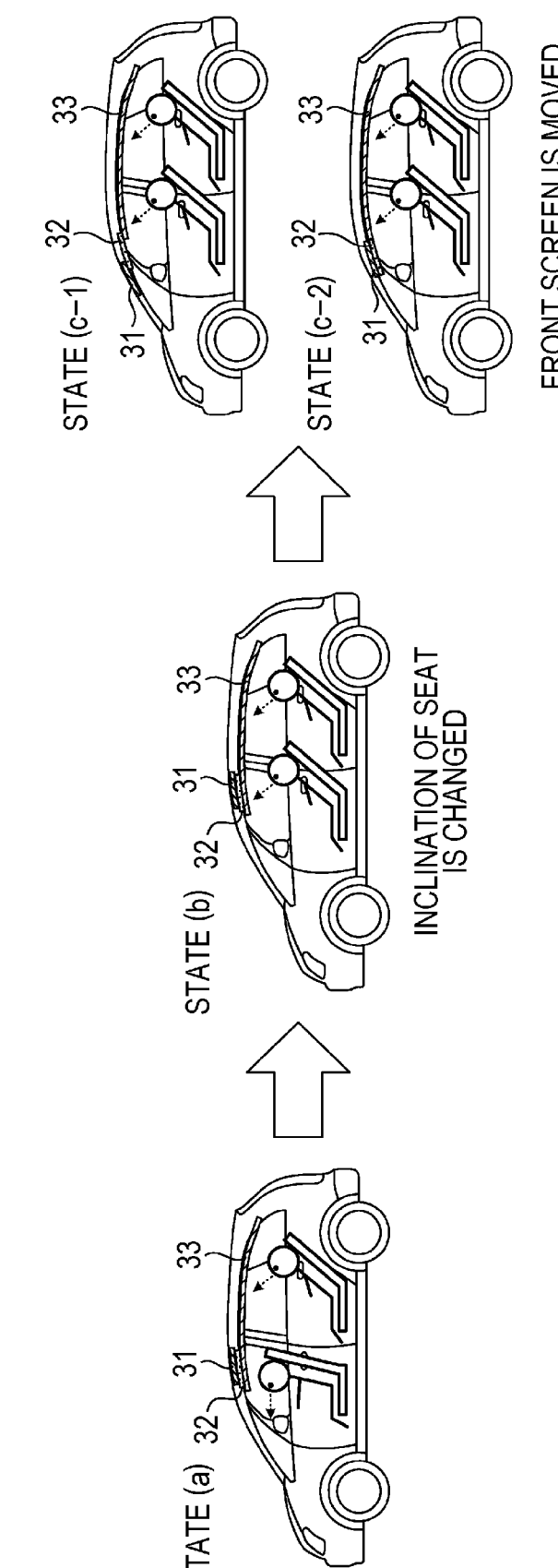
FIG. 7 is a diagram illustrating a relationship between a screen shape and an inclination of a backrest of a seat.

FIG. 7 is a diagram illustrating a relationship between a screen shape and an inclination of a backrest of a seat. State (a) is an initial state in which a backrest of a front seat (a driver' seat or an occupant's seat next to the driver' seat) is not inclined. In a case where the backrest of the front seat is inclined, the state (a) transitions to state (b). The state (b) is a state in which the screen shape is not deformed after the backrest of the front seat is inclined.

At this time, the shape determination unit 152 determines that a shape in which one or both of the lower front screen 31 and the upper front screen 32 are in the taken-out state is suitable for watching content. Therefore, the state (b) transitions to state (c-1) or state (c-2) in accordance with how much the backrest of the seat is inclined by the occupant. That is, one or both of the lower front screen 31 and the upper front screen 32 move to be brought into a taken-out state.

The states (c-1) and (c-2) are states in which the screen shape has been deformed after the backrest of the front seat is inclined. In the state (c-1), both the lower front screen 31 and the upper front screen 32 are in the taken-out state. In the state (c-2), the upper front screen 32 is in the taken-out state.

Figure 8:
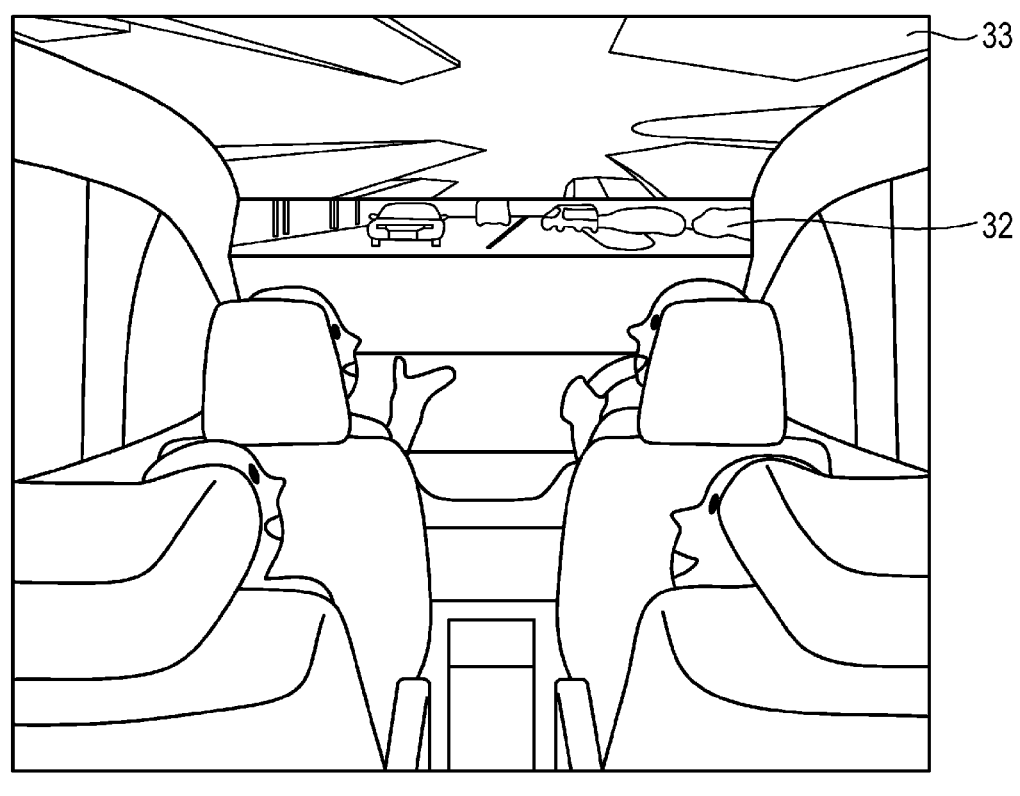
FIG. 8 is a diagram (1) illustrating an example of content displayed on screens.

Hereinafter, a content display mode for each screen shape will be described with an example. FIG. 8 is a diagram (1) illustrating an example of content displayed on the screens. As illustrated in FIG. 8, the image creation unit 153 creates an image obtained by capturing an upward side of the vehicle as an image to be displayed on the look-up screen 33 disposed on the ceiling of the vehicle among the plurality of screens. As illustrated in FIG. 8, the image creation unit 153 also creates an image obtained by capturing a rearward side of the vehicle as an image to be displayed on the upper front screen 32 disposed on the windshield of the vehicle among the plurality of screens. In this way, by displaying surrounding images in real time, an occupant in a vehicle that is not an open car can experience a sense of freedom as if the occupant is in an open car.

Figure 9:
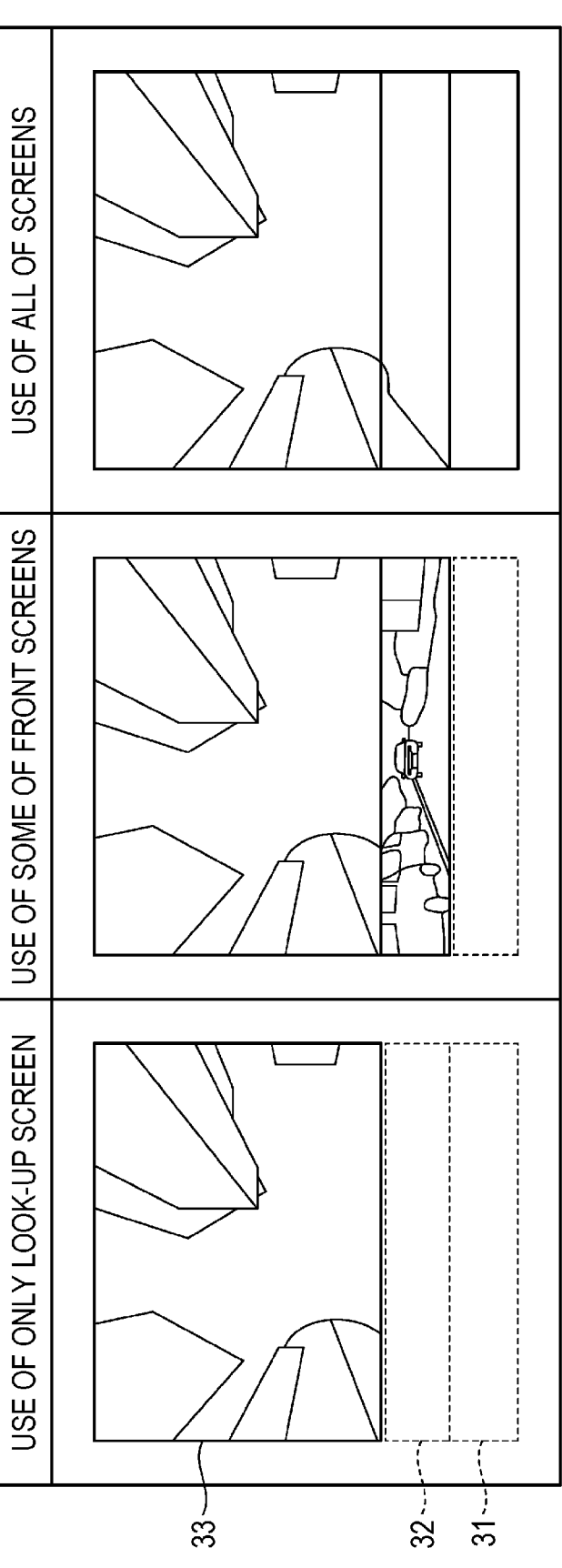
FIG. 9 is a diagram (1) illustrating content display patterns.

FIG. 9 is a diagram (1) illustrating content display patterns. A region surrounded by a solid line indicates a screen that is in use (on which an image is displayed). Furthermore, a region surrounded by a dotted line indicates a screen that is not in use (on which an image is not displayed). As illustrated in FIG. 9, in a case where only the look-up screen is used and in a case where all of the screens are used, none of the screens displays an image obtained by capturing a rear side of the vehicle. This is because driving assistance information is unnecessary as described above. In the pattern in which only the look-up screen is used, the lower front screen 31 and the upper front screen 32 are not used, while the look-up screen 33 is used. In the pattern in which some of the front screens are used, the lower front screen 31 is not used, while the upper front screen 32 and the look-up screen 33 are used. In the pattern in which all of the screens are used, the lower front screen 31, the upper front screen 32, and the look-up screen 33 are used.

Figure 10:
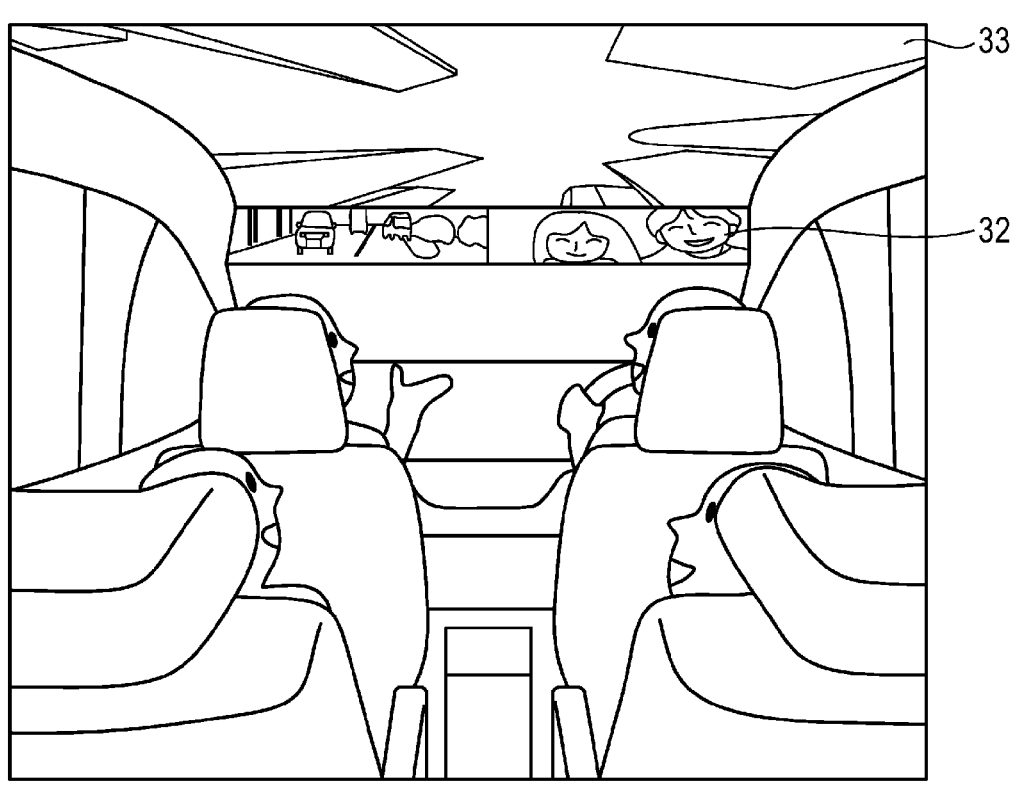
FIG. 10 is a diagram (2) illustrating an example of content displayed on screens.

FIG. 10 is a diagram (2) illustrating an example of content displayed on the screens. As illustrated in FIG. 10, the image creation unit 153 creates an image obtained by capturing a back seat as an image to be displayed on the upper front screen 32 disposed on the windshield of the vehicle among the plurality of screens. Therefore, an occupant on the front seat can talk with an occupant on the back seat while checking an expression of the occupant on the back seat.

Figure 11:
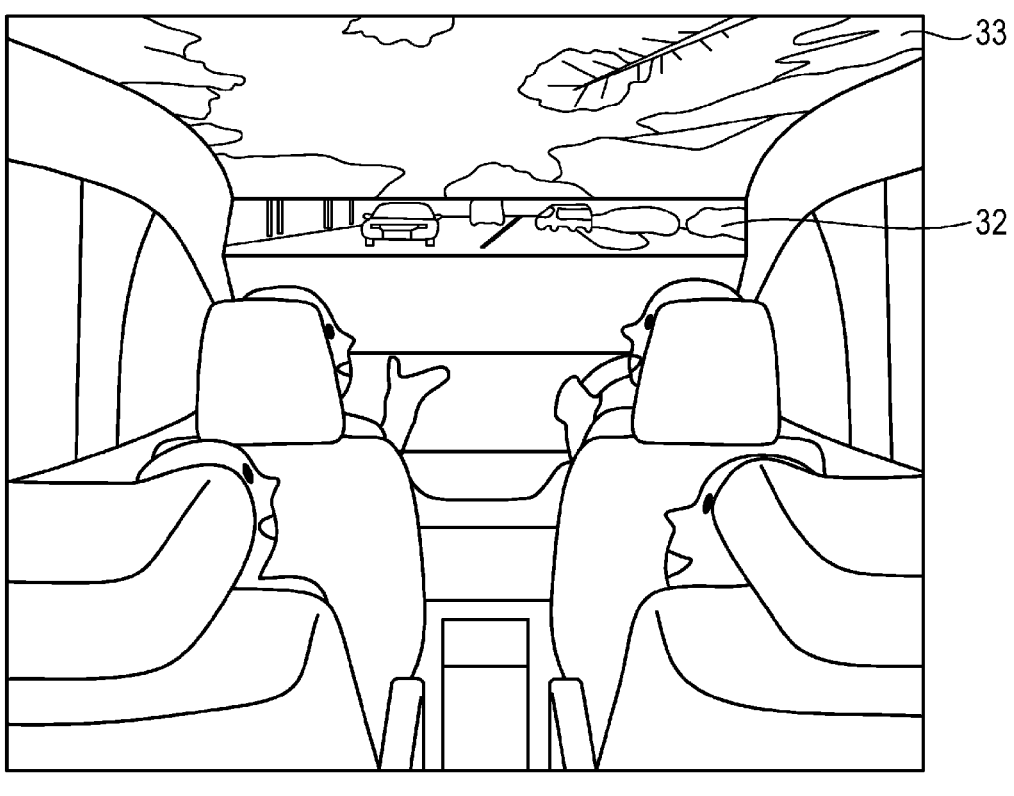
FIG. 11 is a diagram (3) illustrating an example of content displayed on screens.

FIG. 11 is a diagram (3) illustrating an example of content displayed on the screens. In FIG. 9, the image above the vehicle is displayed on the look-up screen 33. In contrast, in FIG. 11, an image different from the image above the vehicle is displayed on the look-up screen 33. For example, by displaying a landscape regarded as a glorious view, a landscape of a sightseeing spot in a foreign country, or the like on the look-up screen 33, an occupant can enjoy a landscape of a place that is not easy to go to.

Figure 12:
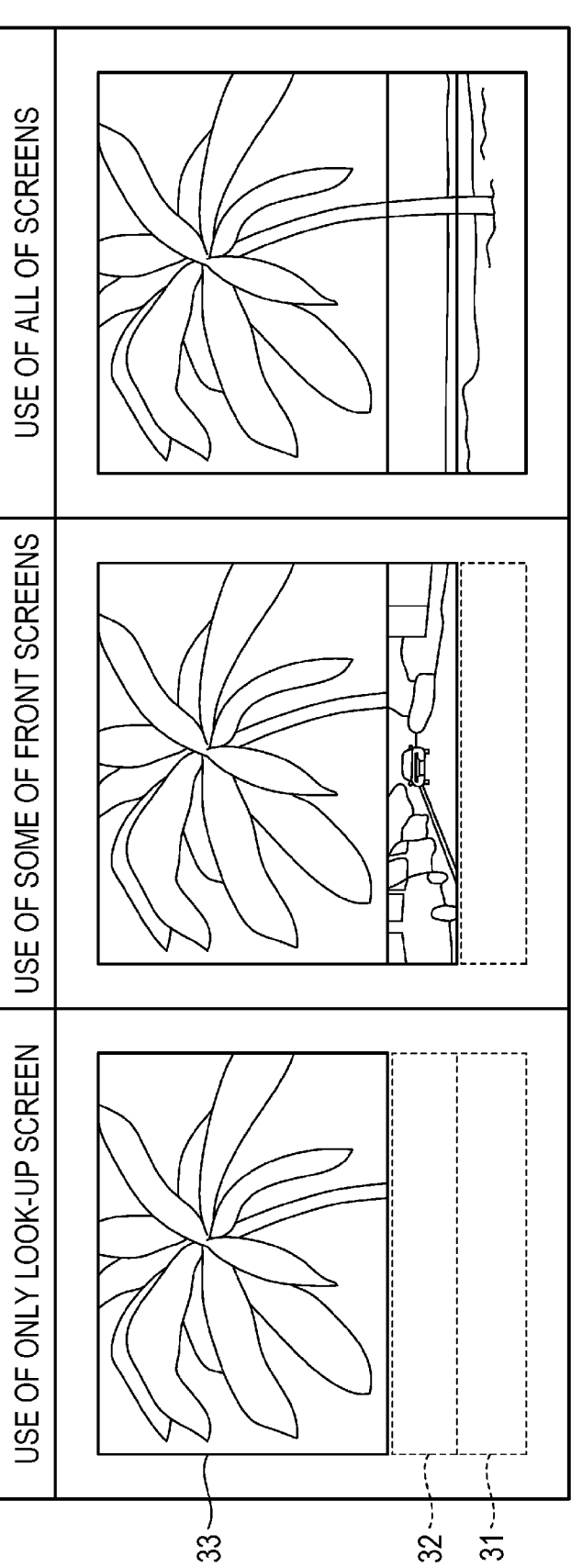
FIG. 12 is a diagram (2) illustrating content display patterns.

FIG. 12 is a diagram (2) illustrating content display patterns. A region surrounded by a solid line indicates a screen that is in use (on which an image is displayed). Furthermore, a region surrounded by a dotted line indicates a screen that is not in use (on which an image is not displayed). Similarly to the example of FIG. 9, in the example of FIG. 12 as well, in a case where only the look-up screen is used and in a case where all of the screens are used, none of the screens displays an image obtained by capturing a rear side of the vehicle. In the pattern in which only the look-up screen is used, the lower front screen 31 and the upper front screen 32 are not used, while the look-up screen 33 is used. In the pattern in which some of the front screens are used, the lower front screen 31 is not used, while the upper front screen 32 and the look-up screen 33 are used. In the pattern in which all of the screens are used, the lower front screen 31, the upper front screen 32, and the look-up screen 33 are used.

The image creation unit 153 creates a first image to be displayed on the look-up screen 33 disposed on the ceiling of the vehicle among the plurality of screens, and a second image for displaying text explaining the first image as an image to be displayed on the upper front screen 32 disposed on the windshield of the vehicle among the plurality of screens.

Figure 13:
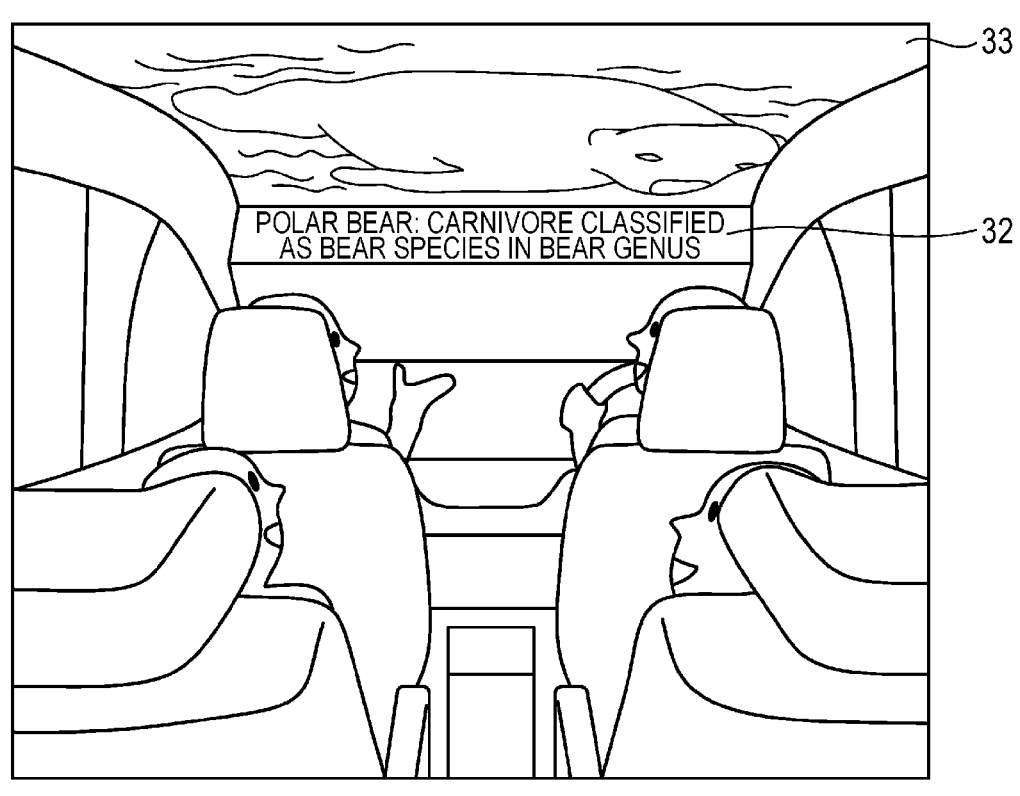
FIG. 13 is a diagram (4) illustrating an example of content displayed on screens.

FIG. 13 is a diagram (4) illustrating an example of content displayed on the screens. In the example of FIG. 13, an image of a polar bear described in a picture book is displayed as the first image on the look-up screen 33. Furthermore, explanation text described in the picture book is displayed on the upper front screen 32. Alternatively, the image creation unit 153 may create an image according to a destination of the vehicle. For example, in a case where the vehicle is traveling toward an aquarium, the image creation unit 153 creates an image of a fish in a picture book and an image of text explaining the fish.

Figure 14:
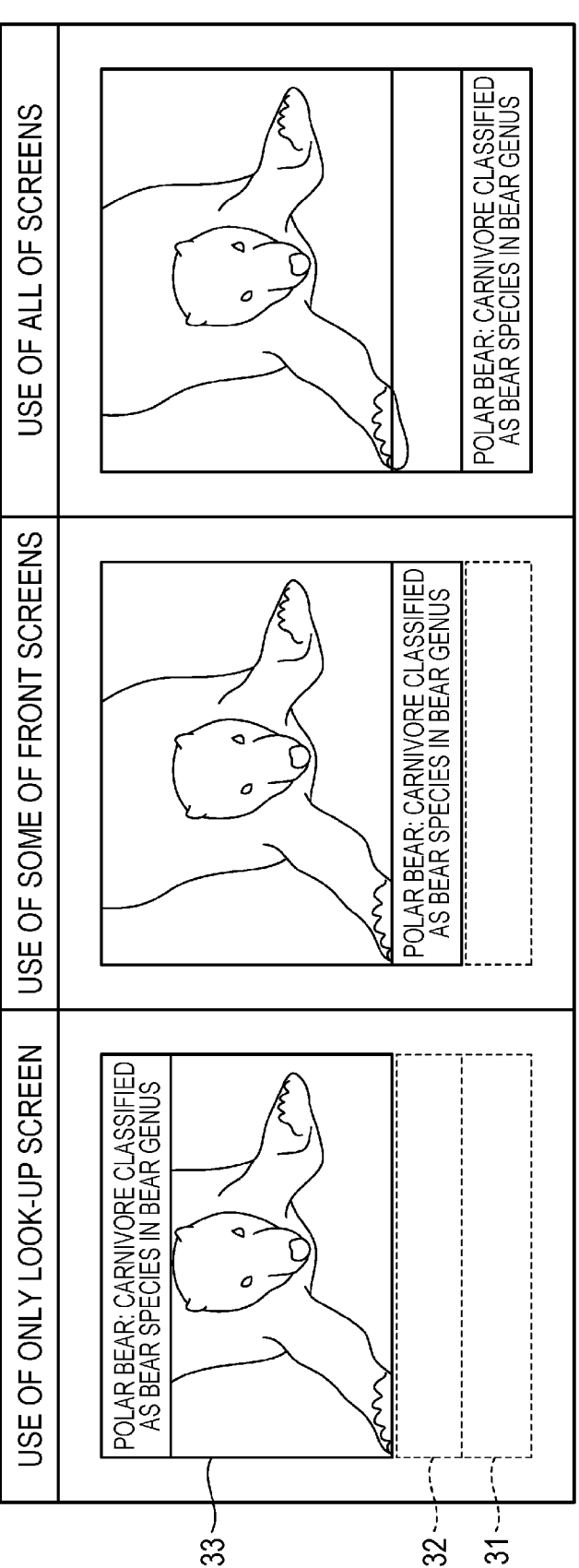
FIG. 14 is a diagram (3) illustrating content display patterns.

FIG. 14 is a diagram (3) illustrating content display patterns. A region surrounded by a solid line indicates a screen that is in use (on which an image is displayed). Furthermore, a region surrounded by a dotted line indicates a screen that is not in use (on which an image is not displayed). In the example of FIG. 14, metadata is displayed according to the display patterns described with reference to FIG. 5. In this case, the metadata is explanation text in the picture book. In the pattern in which only the look-up screen is used, the lower front screen 31 and the upper front screen 32 are not used, while the look-up screen 33 is used. In the pattern in which some of the front screens are used, the lower front screen 31 is not used, while the upper front screen 32 and the look-up screen 33 are used. In the pattern in which all of the screens are used, the lower front screen 31, the upper front screen 32, and the look-up screen 33 are used.

Figure 15:
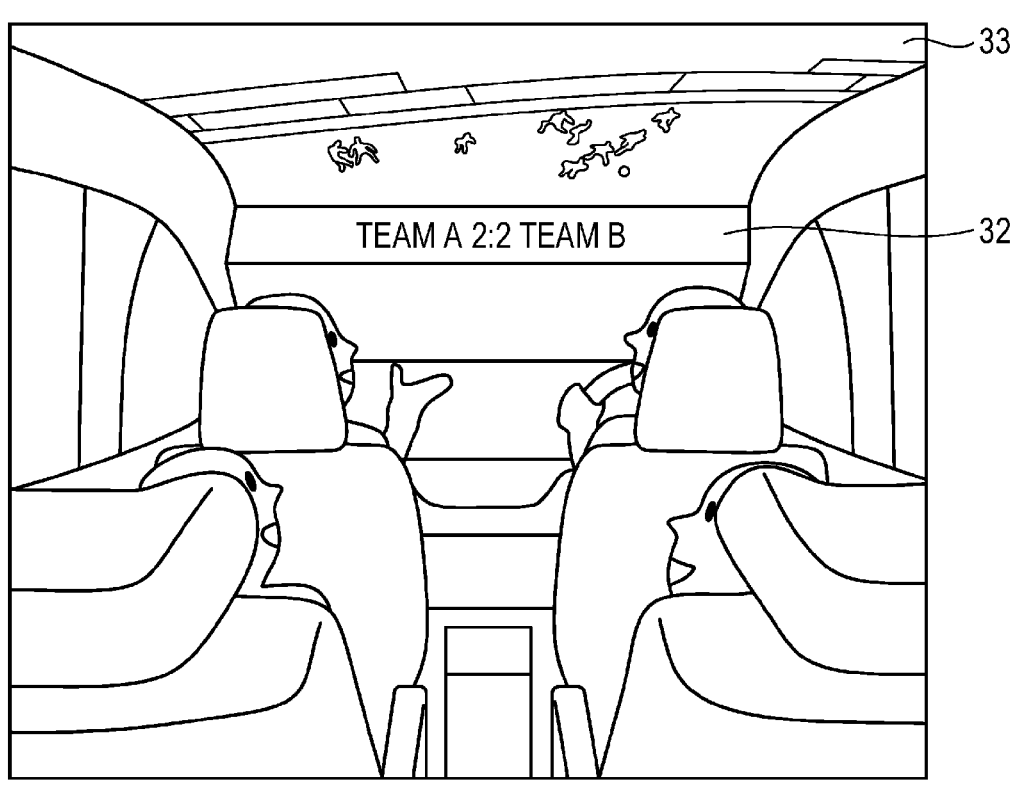
FIG. 15 is a diagram (5) illustrating an example of content displayed on screens.

FIG. 15 is a diagram (5) illustrating an example of content displayed on the screens. In the example of FIG. 15, a video of a soccer game is displayed as the first image on the look-up screen 33. Furthermore, scores of both teams are displayed on the upper front screen 32.

Figure 16:
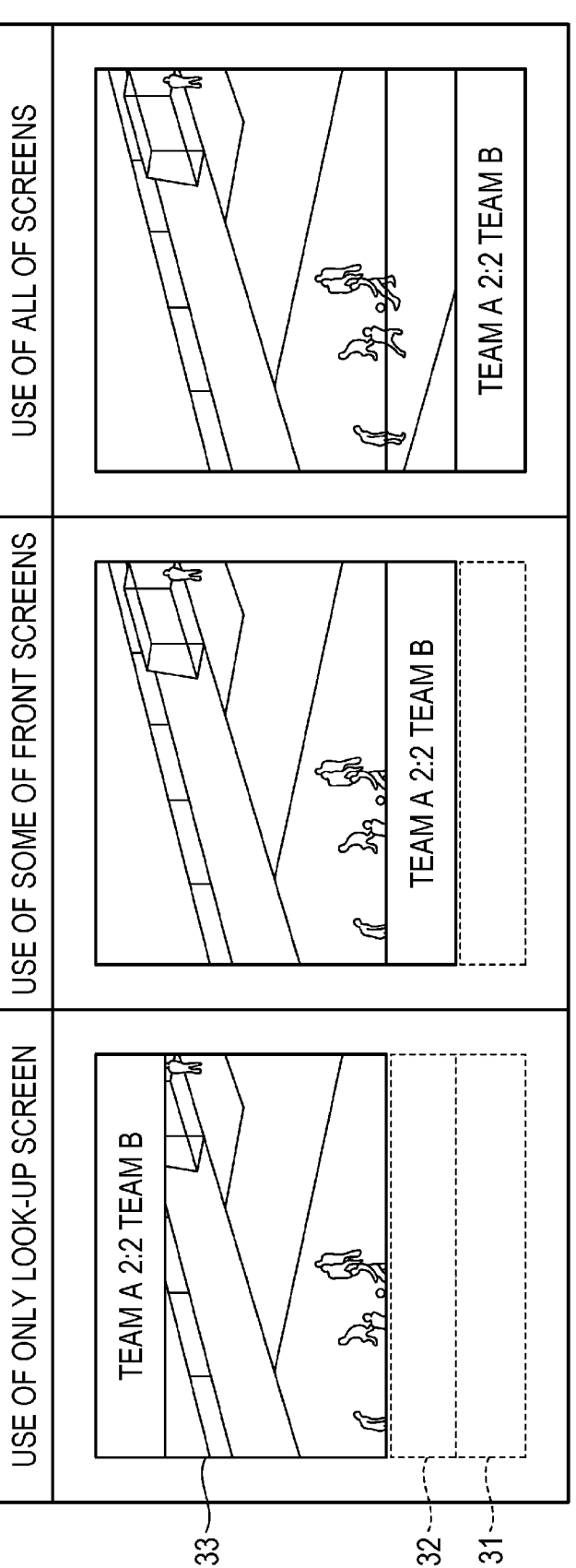
FIG. 16 is a diagram (4) illustrating content display patterns.

FIG. 16 is a diagram (4) illustrating content display patterns. A region surrounded by a solid line indicates a screen that is in use (on which an image is displayed). Furthermore, a region surrounded by a dotted line indicates a screen that is not in use (on which an image is not displayed). In the example of FIG. 14, metadata is displayed according to the display patterns described with reference to FIG. 5. In this case, the metadata is scores of both teams. In the pattern in which only the look-up screen is used, the lower front screen 31 and the upper front screen 32 are not used, while the look-up screen 33 is used. In the pattern in which some of the front screens are used, the lower front screen 31 is not used, while the upper front screen 32 and the look-up screen 33 are used. In the pattern in which all of the screens are used, the lower front screen 31, the upper front screen 32, and the look-up screen 33 are used.

Figure 17:
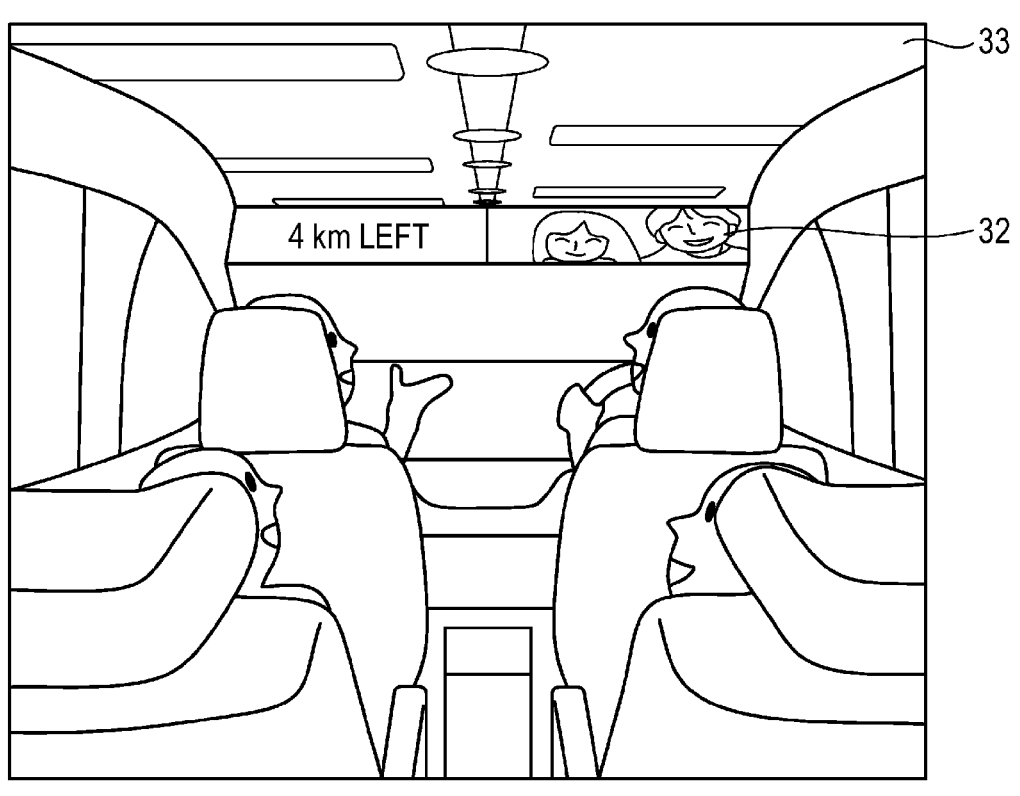
FIG. 17 is a diagram (6) illustrating an example of content displayed on screens.

FIG. 17 is a diagram (6) illustrating an example of content displayed on the screens. In the example of FIG. 17, an image of a route from a current location to a destination is displayed as the first image on the look-up screen 33. Furthermore, a distance to the destination is displayed on the upper front screen 32.

Figure 18:
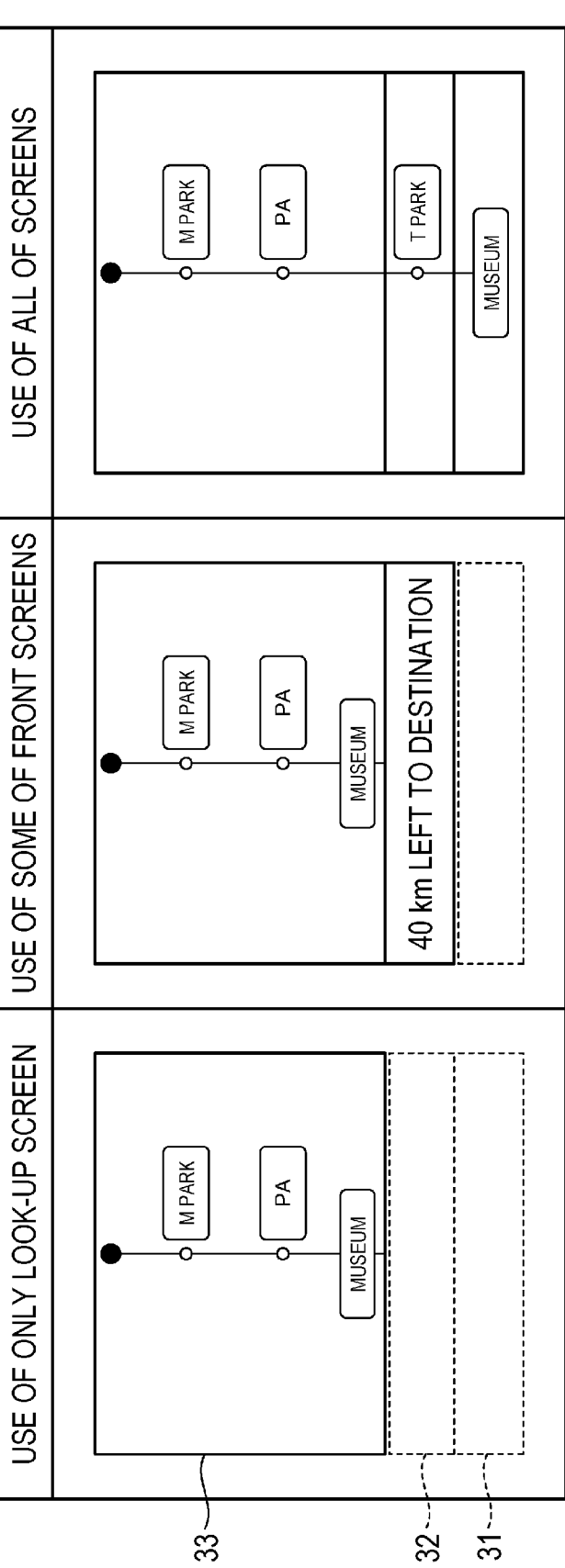
FIG. 18 is a diagram (5) illustrating content display patterns.

FIG. 18 is a diagram (5) illustrating content display patterns. A region surrounded by a solid line indicates a screen that is in use (on which an image is displayed). Furthermore, a region surrounded by a dotted line indicates a screen that is not in use (on which an image is not displayed). Similarly to the example of FIG. 9, in the example of FIG. 18 as well, in a case where only the look-up screen is used and in a case where all of the screens are used, none of the screens displays an image obtained by capturing a rear side of the vehicle. Thus, in a case where manual driving is not performed, it is possible to increase an amount of information to be displayed on the screens. In the pattern in which only the look-up screen is used, the lower front screen 31 and the upper front screen 32 are not used, while the look-up screen 33 is used. In the pattern in which some of the front screens are used, the lower front screen 31 is not used, while the upper front screen 32 and the look-up screen 33 are used. In the pattern in which all of the screens are used, the lower front screen 31, the upper front screen 32, and the look-up screen 33 are used.

Figure 19:
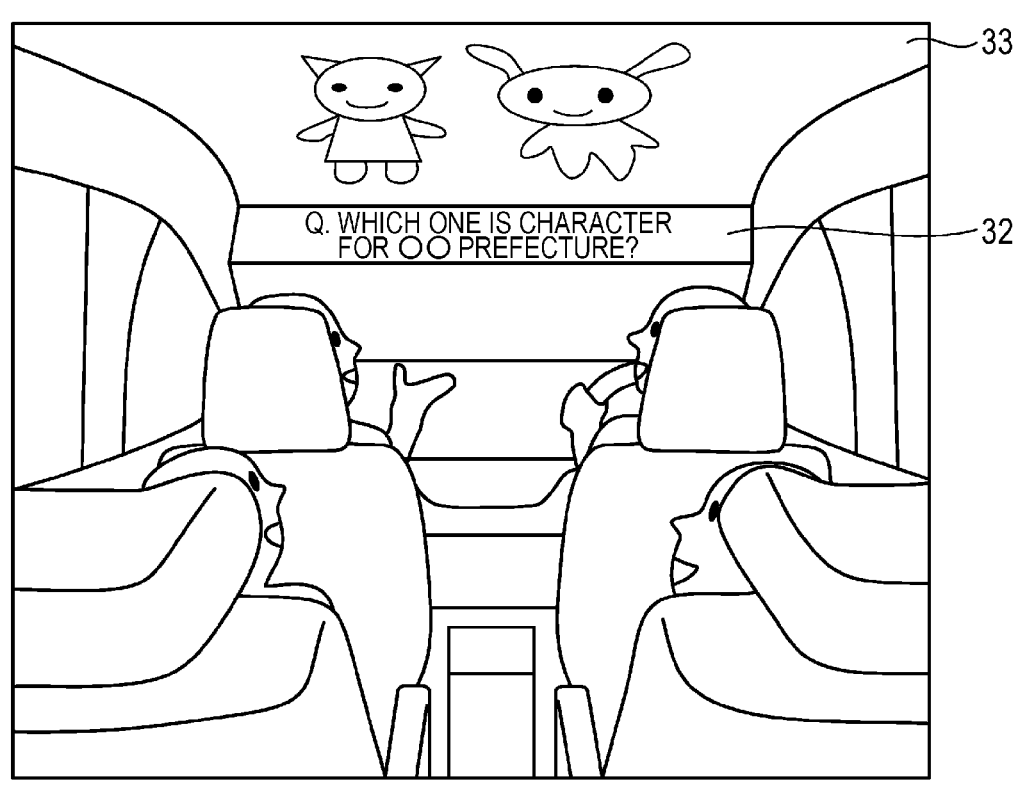
FIG. 19 is a diagram (7) illustrating an example of content displayed on screens.

FIG. 19 is a diagram (7) illustrating an example of content displayed on the screens. In the example of FIG. 19, an image corresponding to options to answer a quiz is displayed as the first image on the look-up screen 33. Furthermore, question text for the quiz is displayed on the upper front screen 32.

Figure 20:
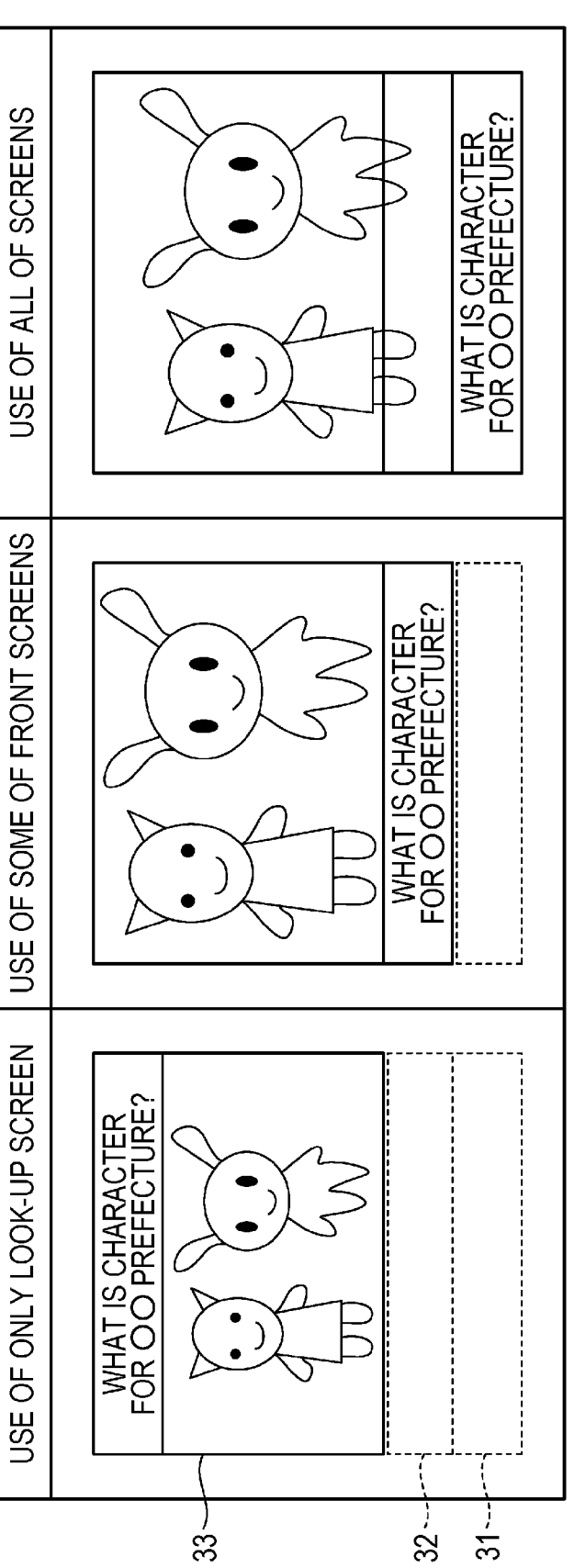
FIG. 20 is a diagram (6) illustrating content display patterns.

FIG. 20 is a diagram (6) illustrating content display patterns. A region surrounded by a solid line indicates a screen that is in use (on which an image is displayed). Furthermore, a region surrounded by a dotted line indicates a screen that is not in use (on which an image is not displayed). In the example of FIG. 20, metadata is displayed according to the display patterns described with reference to FIG. 5. In this case, the metadata is question text for the quiz. In the pattern in which only the look-up screen is used, the lower front screen 31 and the upper front screen 32 are not used, while the look-up screen 33 is used. In the pattern in which some of the front screens are used, the lower front screen 31 is not used, while the upper front screen 32 and the look-up screen 33 are used. In the pattern in which all of the screens are used, the lower front screen 31, the upper front screen 32, and the look-up screen 33 are used.

Figure 21:
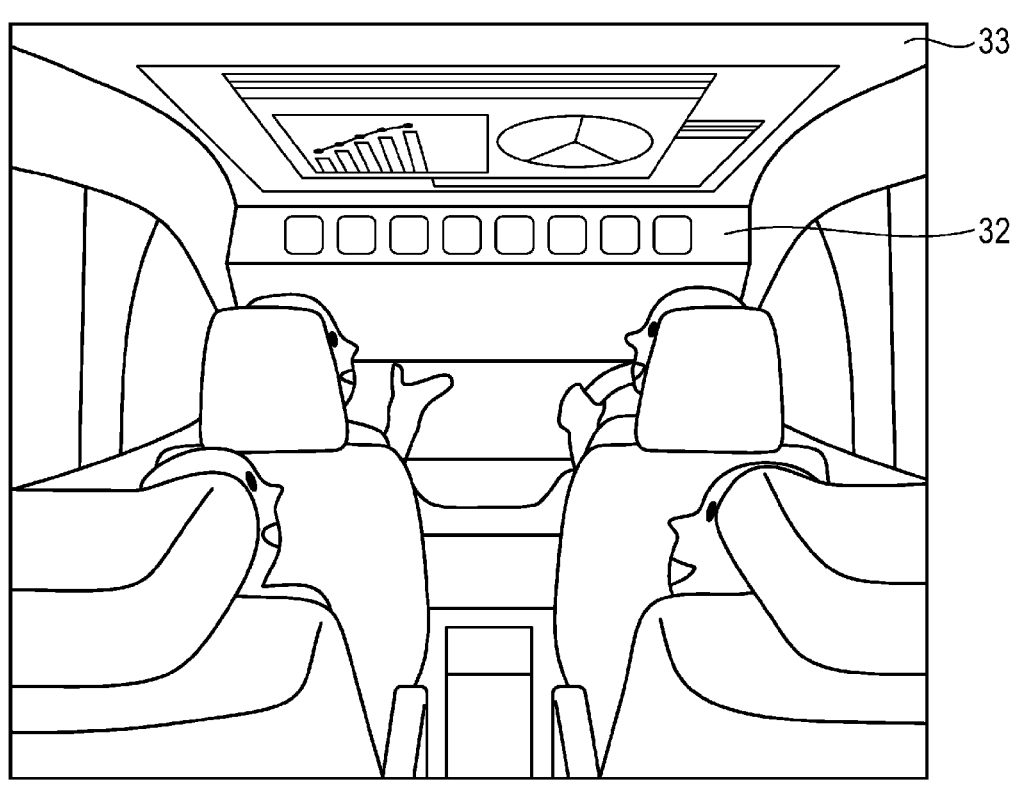
FIG. 21 is a diagram (8) illustrating an example of content displayed on screens.

FIG. 21 is a diagram (8) illustrating an example of content displayed on the screens. In the example of FIG. 21, an image of an application that is running is displayed on the look-up screen 33. Furthermore, an image of an application launcher is displayed on the upper front screen 32.

In this way, the image creation unit 153 creates an image of an application that is running to be displayed on a first screen disposed on the ceiling of the vehicle and an image of an application launcher to be displayed on a second screen disposed on the windshield of the vehicle.

Figure 22:
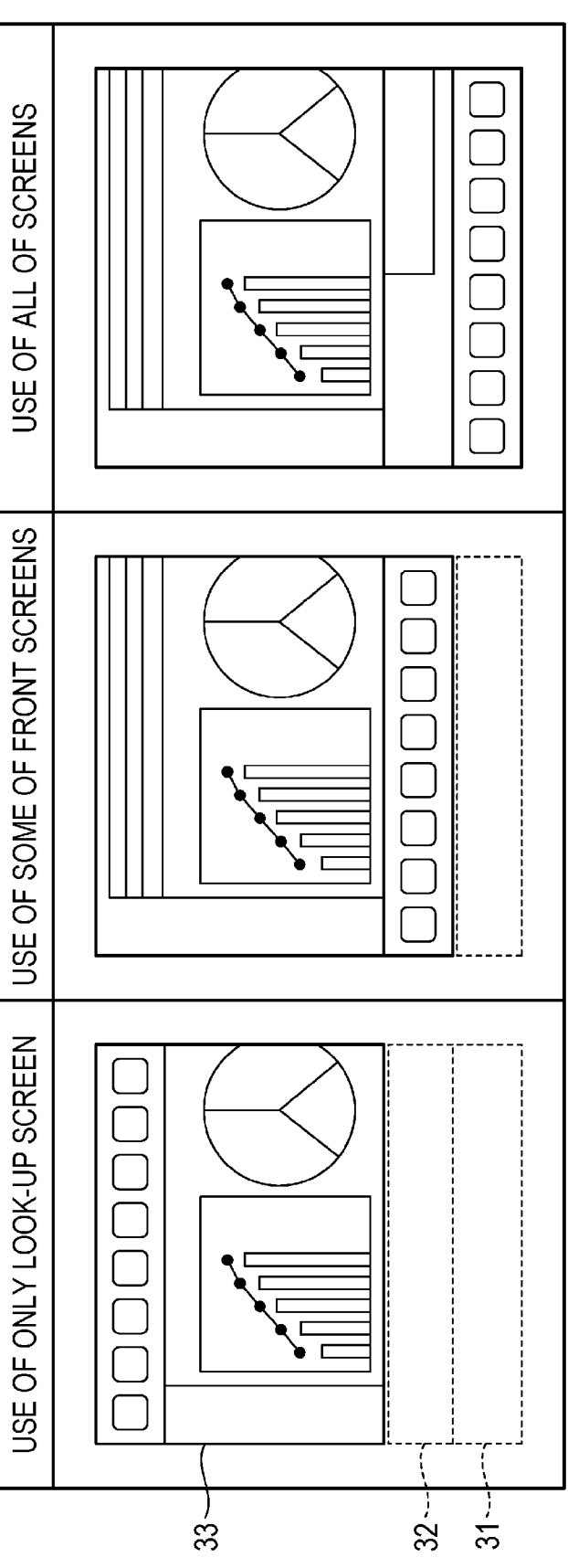
FIG. 22 is a diagram (7) illustrating content display patterns.

FIG. 22 is a diagram (7) illustrating content display patterns. A region surrounded by a solid line indicates a screen that is in use (on which an image is displayed). Furthermore, a region surrounded by a dotted line indicates a screen that is not in use (on which an image is not displayed). In the example of FIG. 22, metadata is displayed according to the display patterns described with reference to FIG. 5. In this case, the metadata is a list of icons of launchable applications or an image of an application launcher. In the pattern in which only the look-up screen is used, the lower front screen 31 and the upper front screen 32 are not used, while the look-up screen 33 is used. In the pattern in which some of the front screens are used, the lower front screen 31 is not used, while the upper front screen 32 and the look-up screen 33 are used. In the pattern in which all of the screens are used, the lower front screen 31, the upper front screen 32, and the look-up screen 33 are used.

Figure 23:
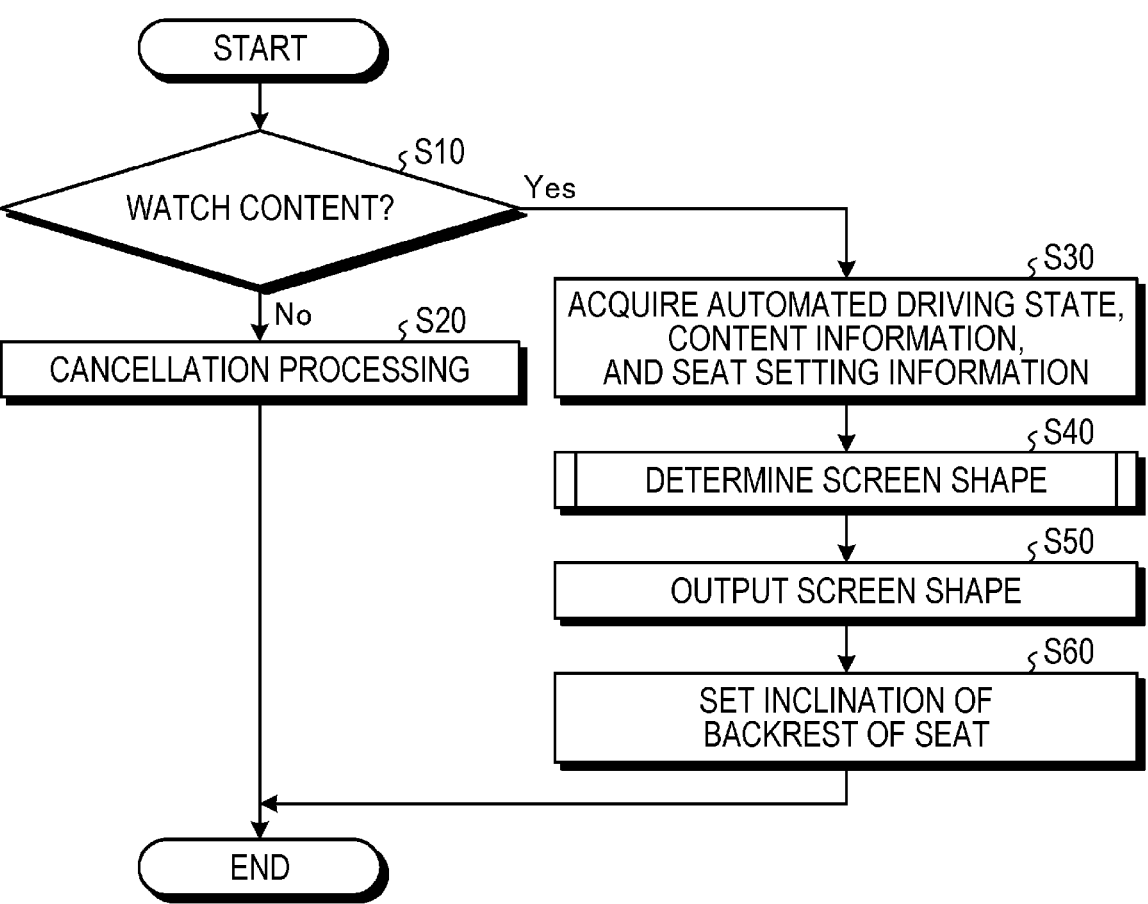
FIG. 23 is a flowchart illustrating a flow of processing by the image processing apparatus according to the first embodiment.

FIG. 23 is a flowchart illustrating a flow of processing by the image processing apparatus according to the first embodiment. As illustrated in FIG. 23, it is determined whether or not an occupant watches content (step S10). For example, in a case where the occupant has performed an operation of giving an instruction to display the content by voice, gesture, or the like, the image processing apparatus 10 determines that the occupant watches the content.

In a case where it is determined that the occupant does not watch the content (step S10, No), the image processing apparatus 10 executes cancellation processing. For example, the image processing apparatus 10 executes the cancellation processing by not displaying an image and bringing the front screens into a housed state (step S20). Alternatively, the image processing apparatus 10 may execute the cancellation processing by displaying black frames.

In a case where it is determined that the occupant watches the content (step S10, Yes), the image processing apparatus 10 acquires an automated driving state, content information, and seat setting information (step S30). Then, the image processing apparatus 10 determines a screen shape (step S40). Moreover, the image processing apparatus 10 outputs the screen shape (step S50), and creates an image corresponding to the screen shape to display the image (step S70).

Figure 24:
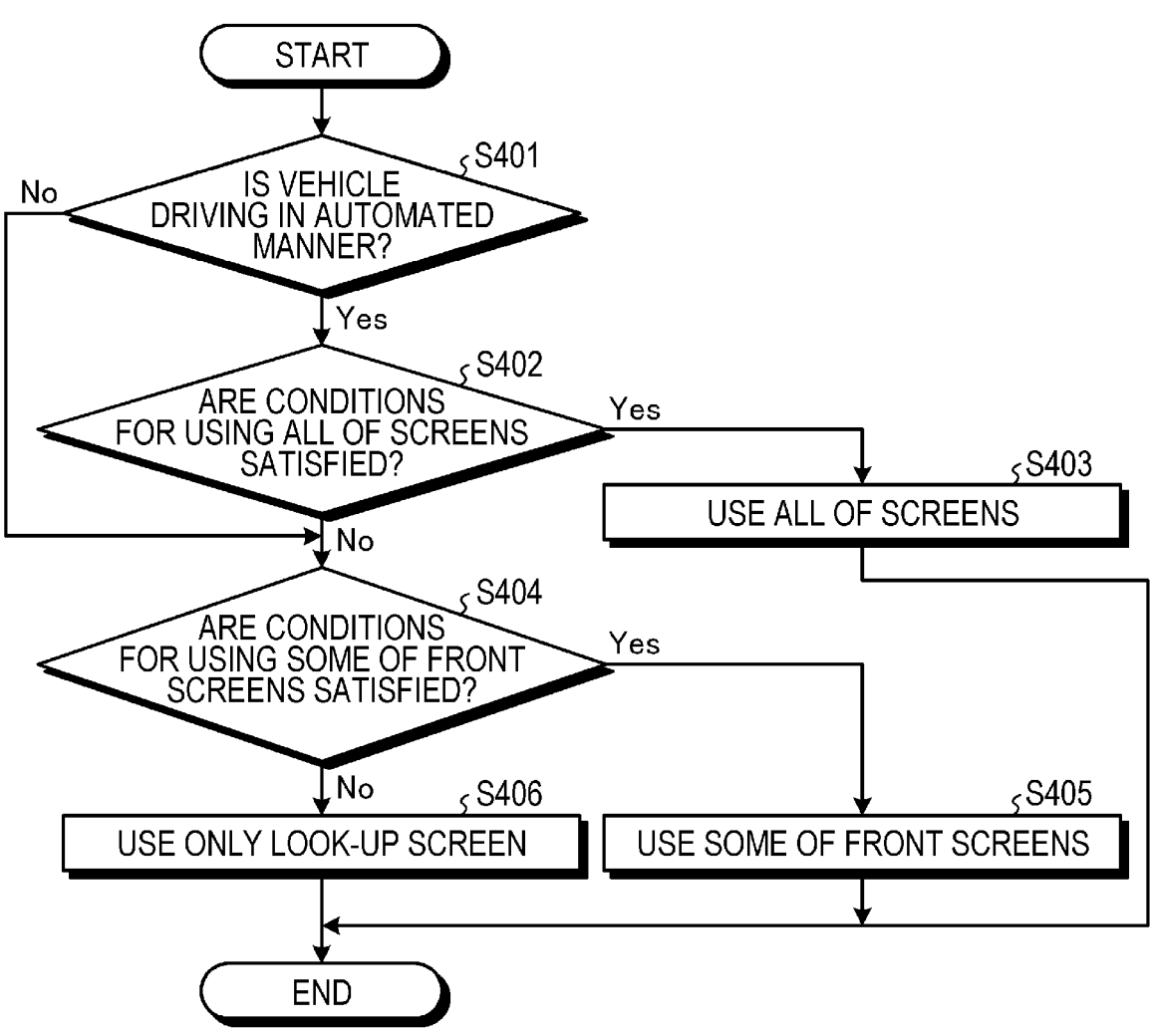
FIG. 24 is a flowchart illustrating a flow of processing for determining a screen shape.

FIG. 24 is a flowchart illustrating a flow of processing for determining a screen shape (step S40 in FIG. 23). As illustrated in FIG. 24, first, the image processing apparatus 10 determines whether or not the vehicle is driving in an automated manner (step S401). In a case where the vehicle is driving in the automated manner (step S401, Yes), the image processing apparatus 10 determines whether or not conditions for using all of the screens are satisfied (step S402). In a case where the vehicle is not driving in the automated manner (step S401, No) or in a case where the conditions for using all of the screens are not satisfied (step S402), the image processing apparatus 10 determines whether or not conditions for using some of the front screens are satisfied (step S404).

In a case where the conditions for using all of the screens are satisfied (step S402, Yes), the image processing apparatus 10 determines the use of all of the screens as an optimum screen shape pattern (step S403). In a case where the conditions for using some of the front screens are satisfied (step S404, Yes), the image processing apparatus 10 determines the use of some of the front screens as an optimum screen shape pattern (step S405). In a case where the conditions for using some of the front screens are not satisfied (step S404, No), the image processing apparatus 10 determines the use of only the look-up screen as an optimum screen shape pattern (step S406).

Effects of First Embodiment

As having been described so far, the image processing apparatus includes: a determination unit (a shape determination unit 152 in the embodiment) that determines a screen shape suitable for displaying content on the basis of an automated driving state of a vehicle and information regarding the content to be displayed on a screen provided in the vehicle; and a creation unit (an image creation unit 153 in the embodiment) that creates an image of the content to be displayed on the screen according to the screen shape determined to be suitable for displaying the content by the determination unit. For example, the image processing apparatus can determine how much field of view a driver needs to secure according to the automated driving state. Furthermore, the image processing apparatus can determine a screen shape suitable for the content. Therefore, according to the first embodiment, a screen mode can be optimized for watching content.

The determination unit determines the screen shape on the basis of the automated driving state including whether or not the vehicle is driving in an automated manner and an automated driving level. Therefore, according to the first embodiment, the screen shape can be finely optimized according to not only whether or not the vehicle is driving in the automated manner but also the automated driving level.

In a case where the automated driving state is a state where the vehicle is driving in an automated manner, the determination unit determines that a shape in which at least one of a plurality of screens is disposed on a windshield of the vehicle is suitable for displaying the content. Therefore, according to the first embodiment, the screens can be optimized to a shape in which watching of content is prioritized in a case where the vehicle is driving in the automated manner.

In a case where the automated driving state is a state where the vehicle is driving in a manual manner, the determination unit determines that a shape in which no screen is disposed on a windshield of the vehicle is suitable for displaying the content. Therefore, according to the first embodiment, the screen can be optimized to a shape is which safety is prioritized in a case where the vehicle is driving in the manual manner.

The determination unit determines the screen shape suitable for displaying the content on the basis of the automated driving state, the information regarding the content, and an inclination of a backrest of a seat in the vehicle. Therefore, according to the first embodiment, an occupant can comfortably watch the content on the screen having a shape optimized for the inclination of the backrest of the seat.

In a case where a backrest of a seat in the vehicle is inclined to a degree unsuitable for driving, the determination unit determines that a shape in which the screen is partially disposed on a windshield of the vehicle is suitable for displaying the content. Therefore, according to the first embodiment, a driver can watch the content more comfortably in a case where the driver is not driving.

The creation unit creates an image indicating information for assisting driving, as an image to be displayed on a screen disposed on a windshield of the vehicle among a plurality of screens. Therefore, according to the first embodiment, driving assistance information can be displayed at a position where a driver easily looks at the driving assistance information during driving.

The creation unit creates an image obtained by capturing an upward side of the vehicle as an image to be displayed on a first screen disposed on a ceiling of the vehicle among a plurality of screens, and an image obtained by capturing a rearward side of the vehicle as an image to be displayed on a second screen disposed on a windshield of the vehicle among the plurality of screens. Therefore, according to the first embodiment, it is possible to display an image through which a situation of the rear side can be checked at a position where a driver easily looks at the image during driving.

The creation unit creates an image obtained by capturing a back seat as an image to be displayed on a screen disposed on a windshield of the vehicle among a plurality of screens. Therefore, according to the first embodiment, an occupant on a front seat can talk with an occupant on the back seat while checking an expression of an occupant on the back seat.

The creation unit creates a first image to be displayed on a first screen disposed on a ceiling of the vehicle among a plurality of screens, and a second image for displaying text explaining the first image as an image to be displayed on a second screen disposed on a windshield of the vehicle among the plurality of screens. Therefore, according to the first embodiment, an occupant can read the explanation text and enjoy the content more deeply.

The creation unit creates an image of an application that is running to be displayed on a first screen disposed on a ceiling of the vehicle and an image of an application launcher to be displayed on a second screen disposed on a windshield of the vehicle. Therefore, according to the first embodiment, an occupant can start and launch the application by an intuitive operation.

2. Second Embodiment

FIG. 25 is a diagram illustrating an example of a configuration of an image processing apparatus according to a second embodiment. As illustrated in FIG. 25, an image processing apparatus 10*a* according to the second embodiment includes a seat setting apparatus 50, unlike the image processing apparatus 10 according to the first embodiment. In the second embodiment, the image processing apparatus 10 determines an optimum inclination of a backrest of a seat on the basis of an automated driving state and content information, and actually sets the optimum inclination according to the determination result.

The shape determination unit 152 further determines an inclination of a backrest of a seat in the vehicle suitable for displaying the content. Then, the seat setting apparatus 50 sets the inclination of the backrest of the seat according to the inclination of the backrest of the seat determined to be suitable for displaying the content by the shape determination unit 152. At this time, the backrest of the seat is automatically inclined according to the set inclination.

Figure 26:
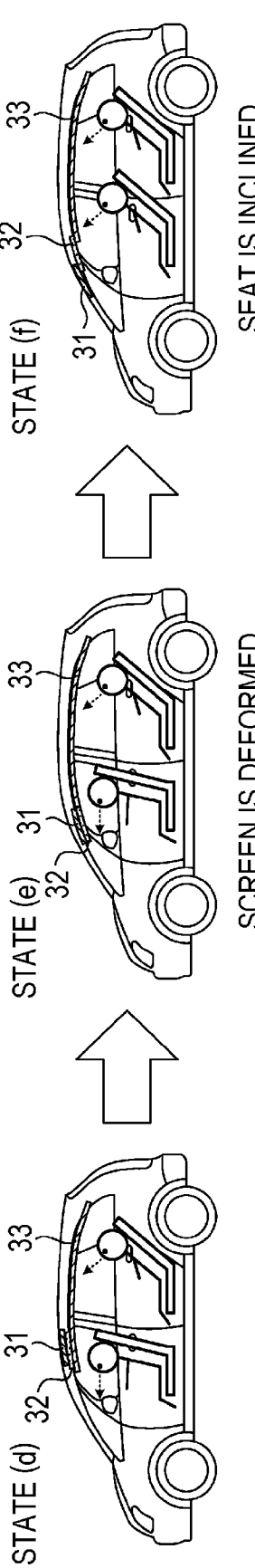
FIG. 26 is a diagram illustrating a relationship between a screen shape and an inclination of a backrest of a seat.

FIG. 26 is a diagram illustrating a relationship between a screen shape and an inclination of a backrest of a seat. State (d) is an initial state in which a backrest of a front seat (a driver' seat or an occupant's seat next to the driver' seat) is not inclined, and a screen shape is not deformed. The undeformed state in the state (d) is a state corresponding to the use of only the look-up screen in FIG. 5. That is, the undeformed state in the state (d) is a state in which both the lower front screen 31 and the upper front screen 32 are in the housed state, and only the look-up screen 33 is in use (an image is displayed thereon).

Here, the shape determination unit 152 determines a screen shape and an inclination of a backrest of a seat which are suitable for content. At this time, the state (d) transitions to state (e). That is, the upper front screen 32 moves to be brought into a taken-out state. On the other hand, the inclination of the backrest of the seat is not changed. The state (e) is a state in which the inclination of the backrest of the seat has not been changed, while the screen shape has been deformed. The deformed state in the state (e) is a state corresponding to the use of some of the front screens in FIG. 5. That is, the deformed state in the state (e) is a state in which the lower front screen 31 is in the housed state and the upper front screen 32 is in the taken-out state, and the upper front screen 32 and the look-up screen 33 are in use (an image is displayed thereon).

Moreover, in a case where another content is displayed, for example, using all of the screens, the shape determination unit 152 further determines a screen shape and an inclination of the backrest of the seat. At this time, the state (e) transitions to state (f). That is, the lower front screen 31 moves to be brought into a taken-out state. As a result, all of the screens are used. Moreover, the inclination of the backrest of the front seat is changed. The state (f) is a state in which the screen shape has been deformed, and the inclination of the backrest of the seat has been changed. The deformed state in the state (f) is a state corresponding to the use of all of the screens in FIG. 5. That is, the deformed state in the state (f) is a state in which both the lower front screen 31 and the upper front screen 32 are in the taken-out state, and the lower front screen 31, the upper front screen 32, and the look-up screen 33 are in use (an image is displayed thereon). Here, since all of the screens including the look-up screen 33 are in use, the backrest of the front seat is tilted at more than an angle suitable for driving.

Figure 27:
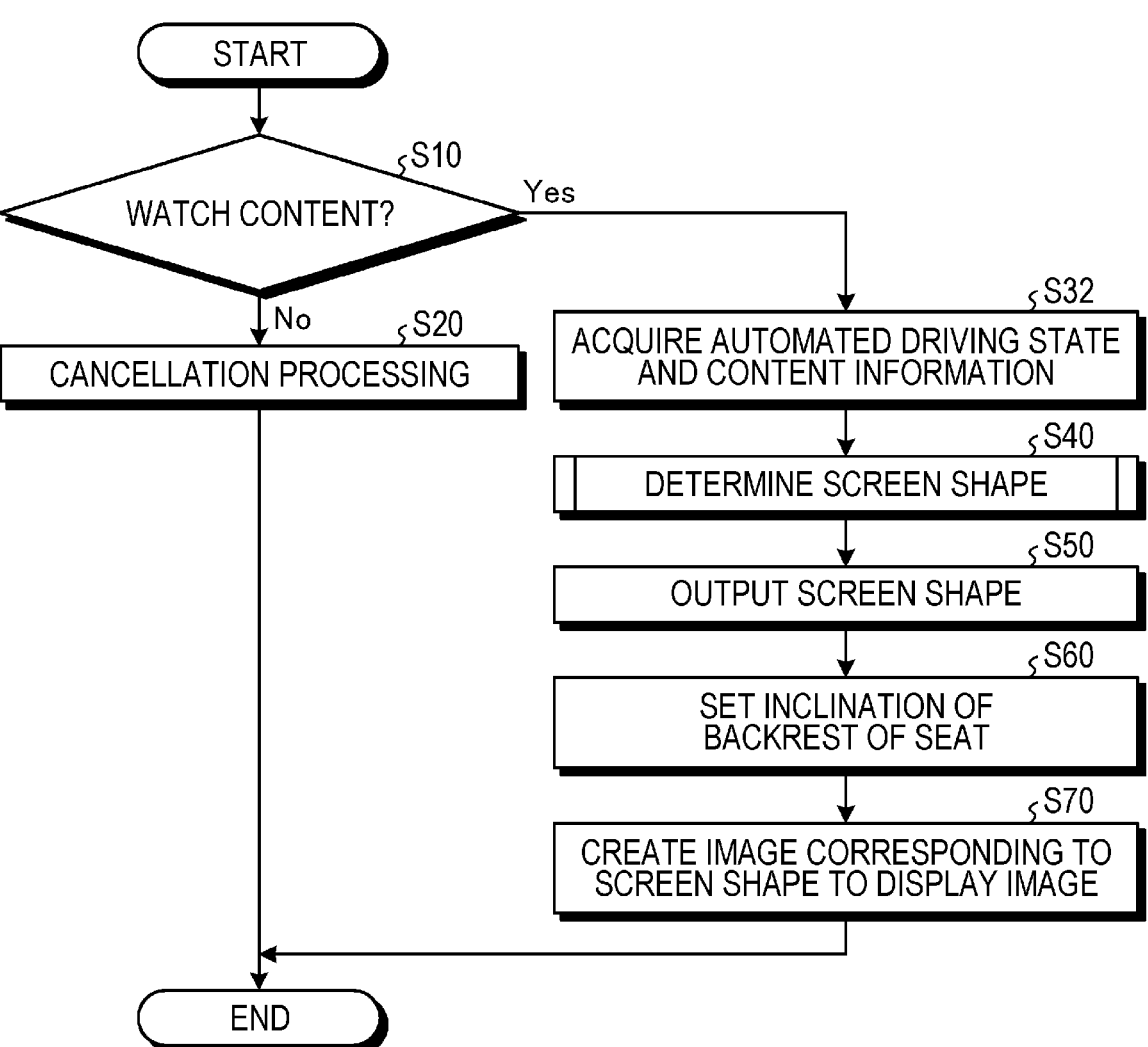
FIG. 27 is a flowchart illustrating a flow of processing by the image processing apparatus according to the second embodiment.

FIG. 27 is a flowchart illustrating a flow of processing by the image processing apparatus according to the second embodiment. As illustrated in FIG. 27, it is determined whether or not an occupant watches content (step S10). In a case where it is determined that the occupant does not watch the content (step S10, No), the image processing apparatus 10 executes cancellation processing.

In a case where it is determined that the occupant watches the content (step S10, Yes), the image processing apparatus 10 acquires an automated driving state and content information (step S31). Then, the image processing apparatus 10 determines a screen shape (step S40). Moreover, the image processing apparatus 10 outputs the screen shape (step S50), sets an inclination of a backrest of a seat (step S60), and creates an image corresponding to the screen shape to display the image (step S70).

The determination unit (the shape determination unit 152 in the embodiment) further determines an inclination of a backrest of a seat in the vehicle suitable for displaying the content. The seat setting unit (the seat setting apparatus 50 in the embodiment) sets the inclination of the seat according to the inclination of the backrest of the seat determined to be suitable for displaying the content by the determination unit. Therefore, according to the second embodiment, the occupant can watch the content in a comfortable position without manually changing the inclination of the backrest of the seat.

3. Third Embodiment

Figure 28:
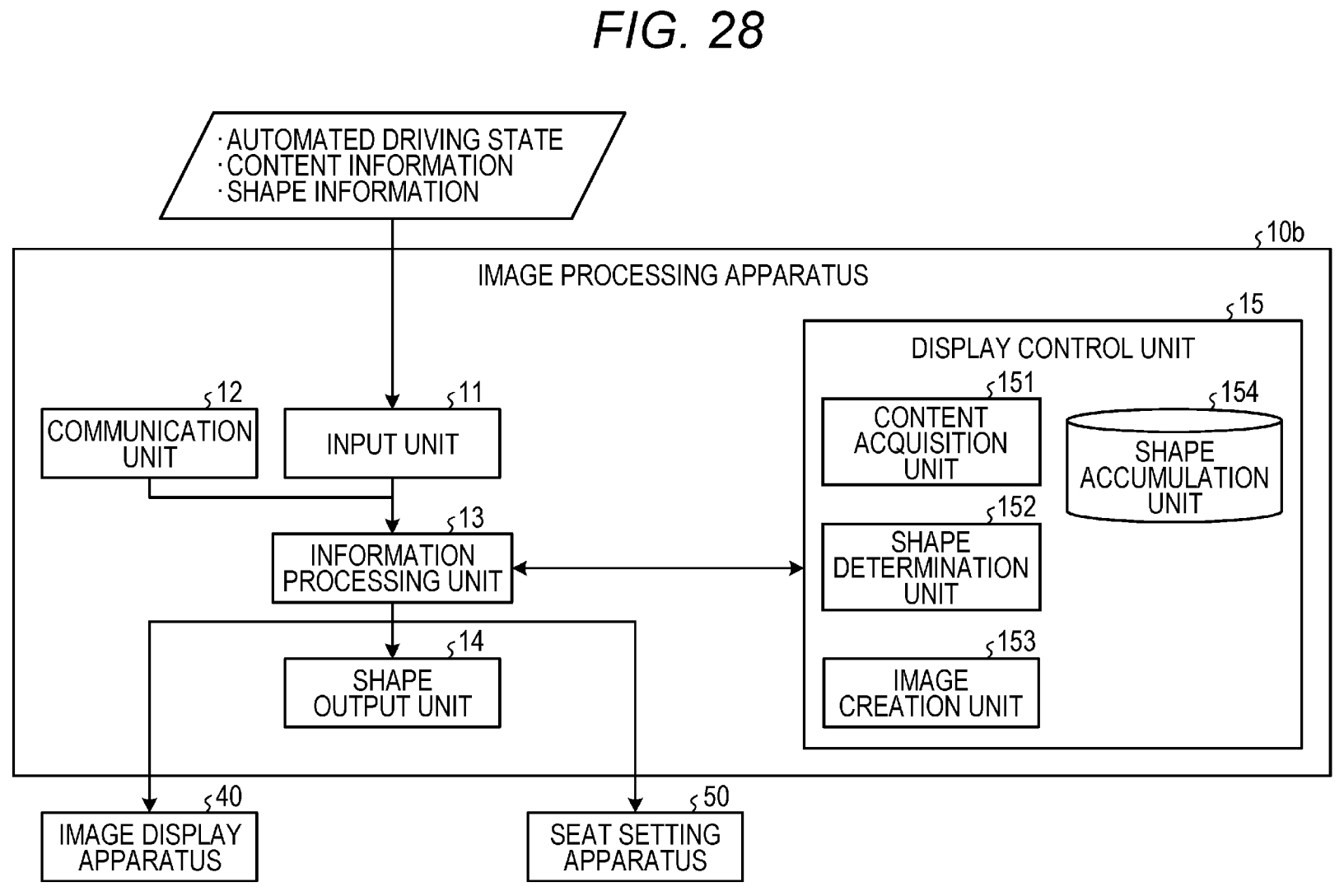

FIG. 28 is a diagram illustrating an example of a configuration of an image processing apparatus according to a third embodiment. As illustrated in FIG. 28, an image processing apparatus 10b according to the second embodiment receives an input regarding shape information, unlike the image processing apparatus 10a according to the second embodiment. In the third embodiment, the image processing apparatus 10 determines an optimum inclination of a backrest of a seat on the basis of shape information specified by an occupant in addition to an automated driving state and content information, and actually sets the optimum inclination according to the determination result.

The shape information is a screen shape specified by the occupant. For example, the occupant specifies one of use of only the look-up screen, use of some of the front screens, and use of all of the screens. The image processing apparatus 10b determines a screen shape by giving priority to what is specified by the occupant. However, in a case where it is not possible to change the screen shape to what is specified by the occupant, the image processing apparatus 10b may not prioritize the screen shape specified by the occupant. For example, in a case where the occupant specifies the use of all of the screens while the vehicle is driving in the manual manner, the image processing apparatus 10b does not determine the use of all of the screens as an optimum screen shape.

Figure 29:
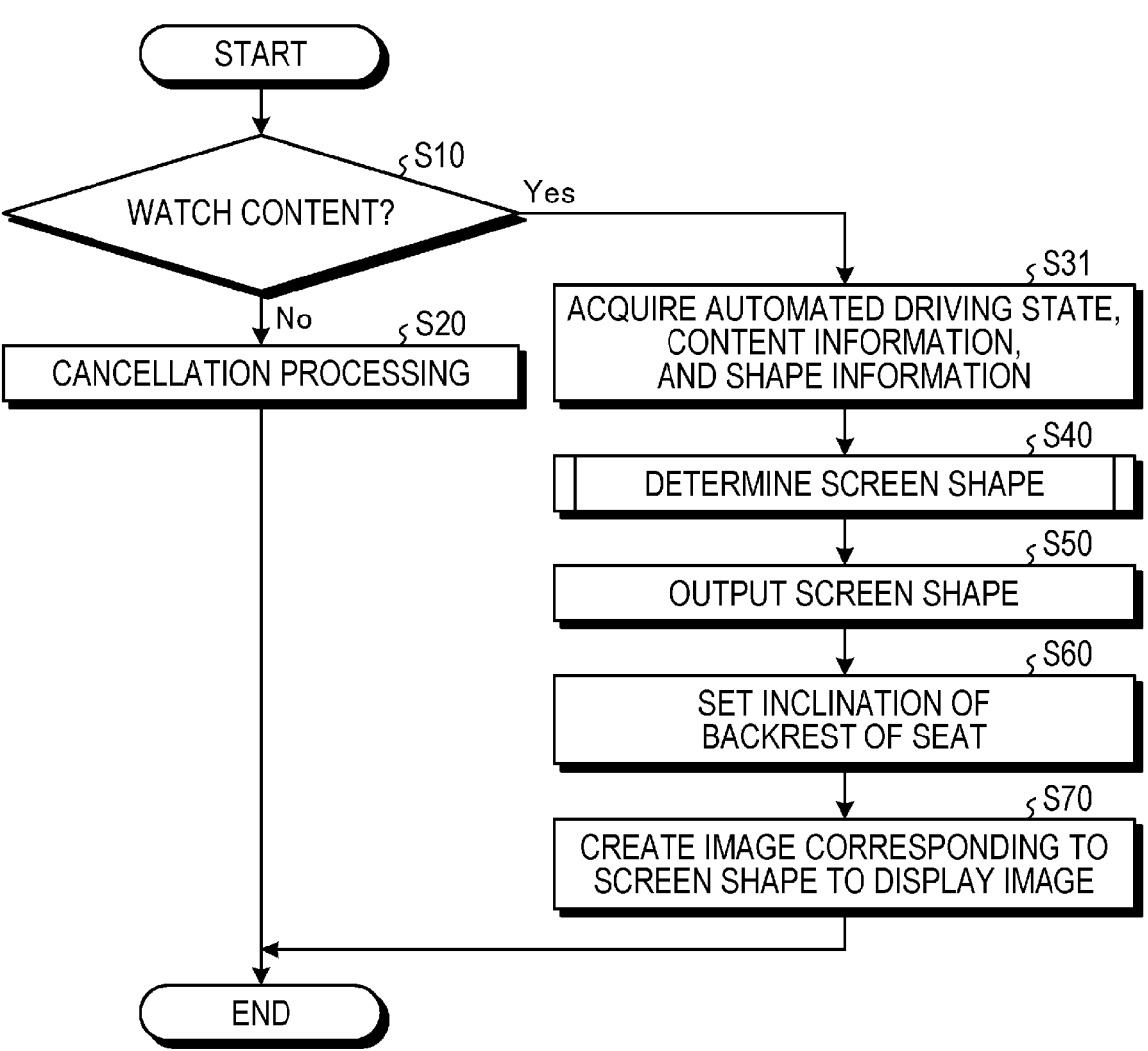
FIG. 29 is a flowchart illustrating a flow of processing by the image processing apparatus according to the third embodiment.

FIG. 29 is a flowchart illustrating a flow of processing by the image processing apparatus according to the third embodiment. As illustrated in FIG. 29, it is determined whether or not an occupant watches content (step S10). In a case where it is determined that the occupant does not watch the content (step S10, No), the image processing apparatus 10 executes cancellation processing.

In a case where it is determined that the occupant watches the content (step S10, Yes), the image processing apparatus 10 acquires an automated driving state, content information, and shape information (step S31). Then, the image processing apparatus 10 determines a screen shape (step S40). Moreover, the image processing apparatus 10 outputs the screen shape (step S50), sets an inclination of a backrest of a seat (step S60), and creates an image corresponding to the screen shape to display the image (step S70). As an example of the inclination of the backrest of the seat, the example of FIG. 26 described in the second embodiment may be referred to. In the example of FIG. 26, the inclination of the backrest of the front seat may be set to either an angle suitable for driving or an angle larger than the angle suitable for driving.

Other Embodiments

As illustrated in FIG. 14, etc., in the embodiments having been described so far, the main content and the metadata corresponding to the main content are simultaneously displayed. On the other hand, as illustrated in FIG. 30, main content and metadata unrelated to each other, or different types of main content may be simultaneously displayed on the screens.

Figure 30:
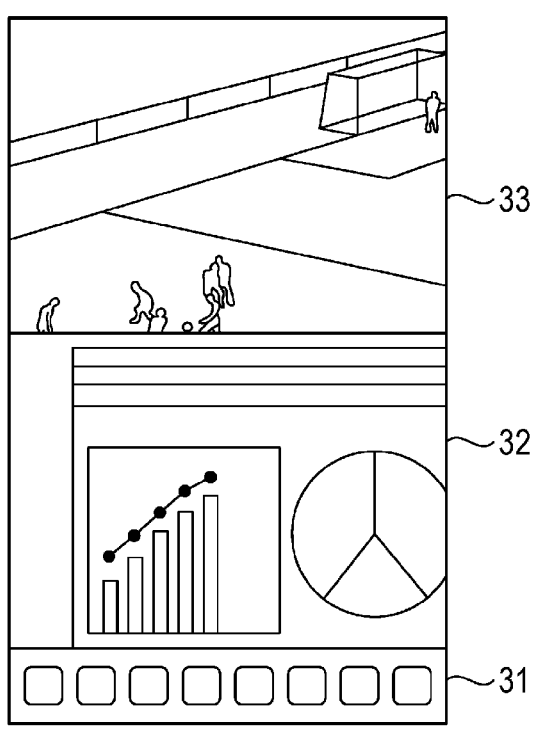
FIG. 30 is a diagram (9) illustrating an example of content displayed on screens.

FIG. 30 is a diagram (9) illustrating an example of content displayed on the screens. In the example of FIG. 30, a video of a soccer game is displayed on the look-up screen 33. Furthermore, a frame of an application that is running is displayed on the upper front screen 32. In addition, a frame of an application launcher is displayed on the lower front screen 31. Therefore, while a certain occupant is watching content on all of the screens, another occupant can watch another content on the front screens.

4. Example of Application to Mobile Body

The technology according to the present disclosure (present technology) can be applied to various products. For example, the technology according to the present disclosure may be achieved as a device mounted on any type of mobile body such as a vehicle, an electric vehicle, a hybrid electric vehicle, a motorcycle, a bicycle, a personal mobility, an airplane, a drone, a ship, or a robot.

Figure 31:
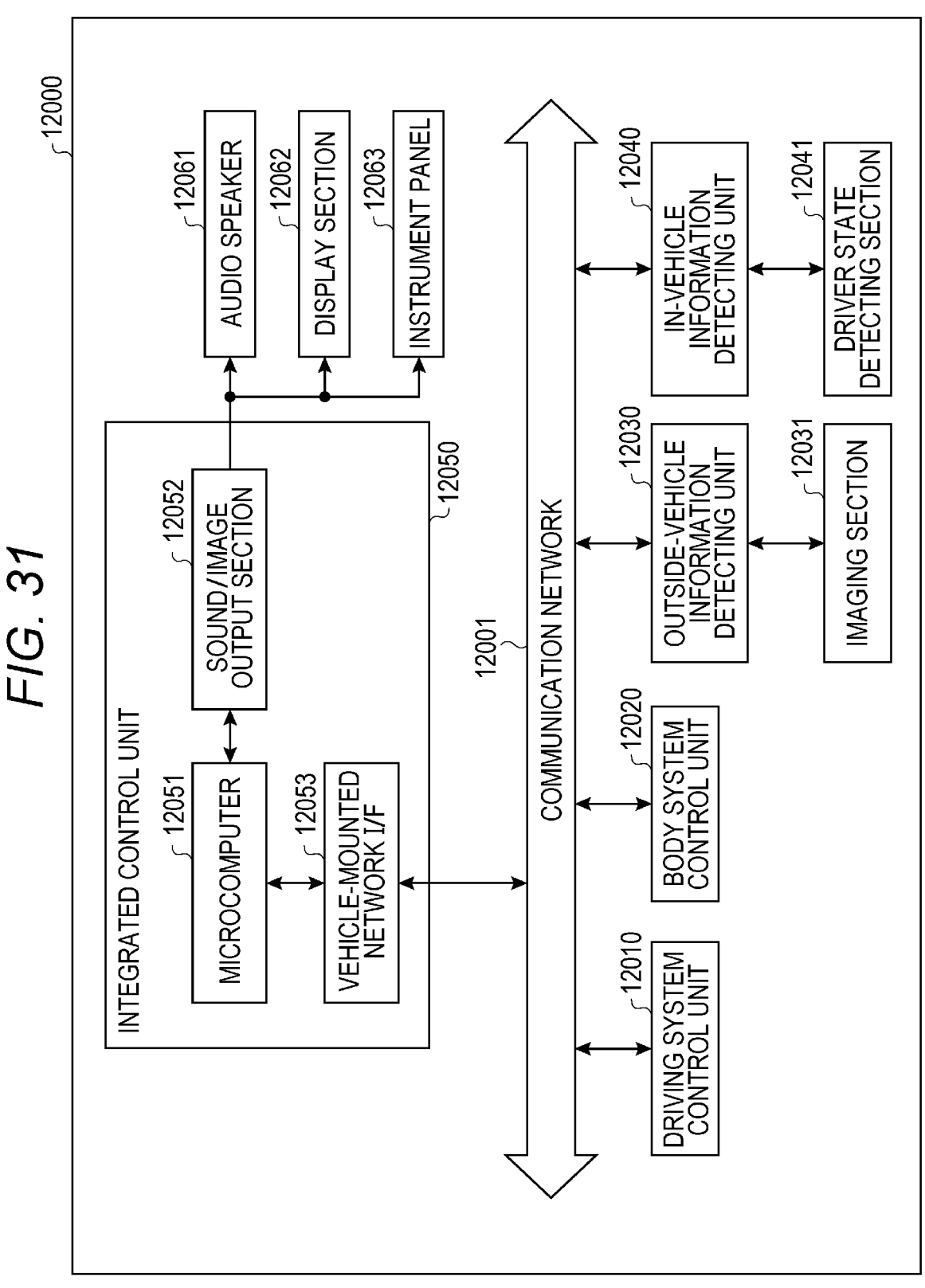
FIG. 31 is a block diagram illustrating an example of schematic configuration of a vehicle control system.

FIG. 31 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 31, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or auditorily notifying information to an occupant of the vehicle or the outside of the vehicle. In the example of FIG. 31, an audio speaker 12061, a display section 12062, and an instrument panel 12063 are illustrated as the output device. The display section 12062 may, for example, include at least one of an on-board display or a head-up display.

Figure 32:
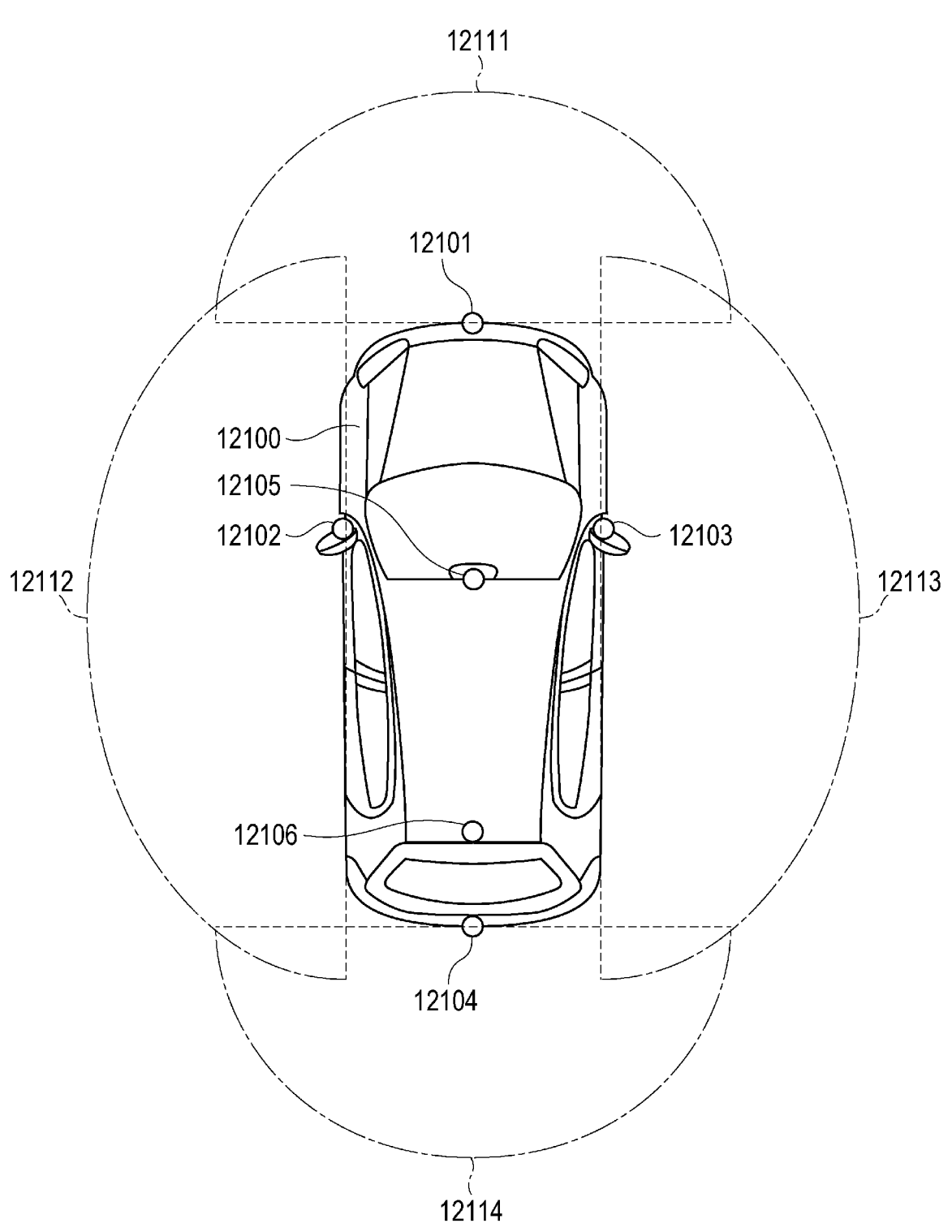
FIG. 32 is a diagram (1) illustrating an example of an installation position of an imaging section.

FIG. 32 is a diagram (1) depicting an example of the installation position of the imaging section.

In FIG. 32, the imaging section 12031 includes imaging sections 12101, 12102, 12103, 12104, 12105, and 12106.

The imaging sections 12101, 12102, 12103, 12104, 12105, and 12106 are, for example, disposed at positions on a front nose, sideview mirrors, a rear bumper, and a back door of the vehicle 12100 as well as a position on an upper portion of a windshield within the interior of the vehicle and a roof. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like. The imaging section 12106 provided in the roof mainly captures an image upwardly.

Incidentally, FIG. 32 depicts an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. Further, the sound/image output section 12052 may also control the display section 12062 so that an icon or the like representing the pedestrian is displayed at a desired position.

Figure 33:
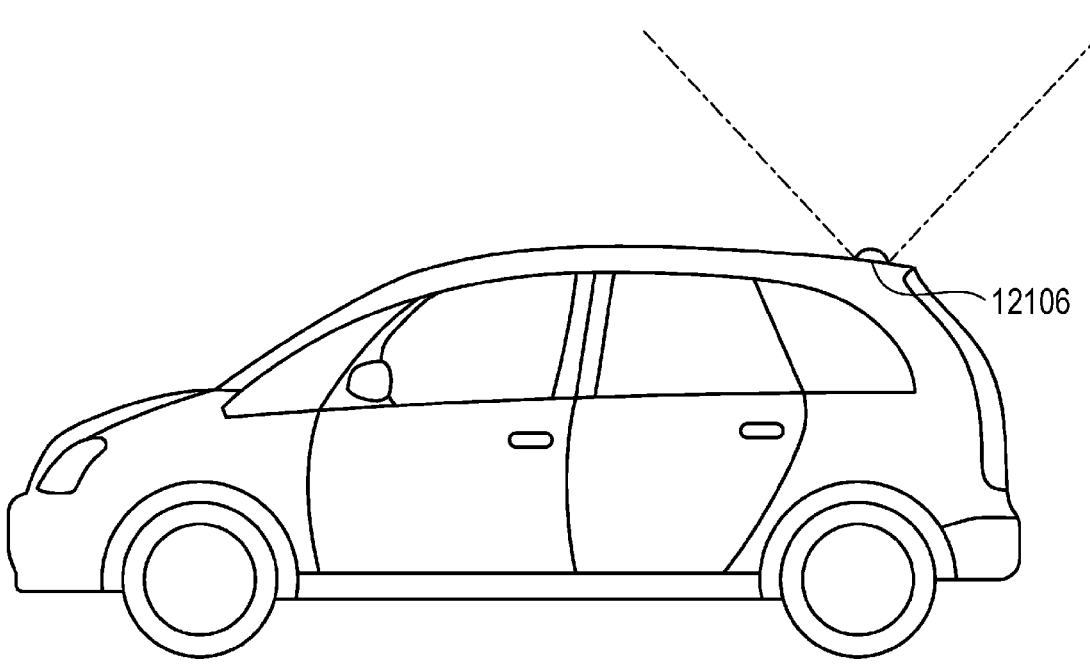
FIG. 33 is a diagram (2) illustrating an example of an installation position of an imaging section.

FIG. 33 is a diagram (2) depicting an example of the installation position of the imaging section. As illustrated in FIG. 33, the imaging section 12106 captures an image above the vehicle. The imaging section 12106 may be a wide-angle camera or an all-around camera.

An example of the vehicle control system to which the technology according to the present disclosure can be applied has been described above. The technology according to the present disclosure can be applied to the microcomputer 12051 among the above-described configurations. Specifically, the processing by the display control unit 15 of the image processing apparatus 10 is achieved by the microcomputer 12051. Furthermore, the image above the vehicle described with reference to FIG. 8, etc. may be captured by the imaging section 12106.

Figure 34:
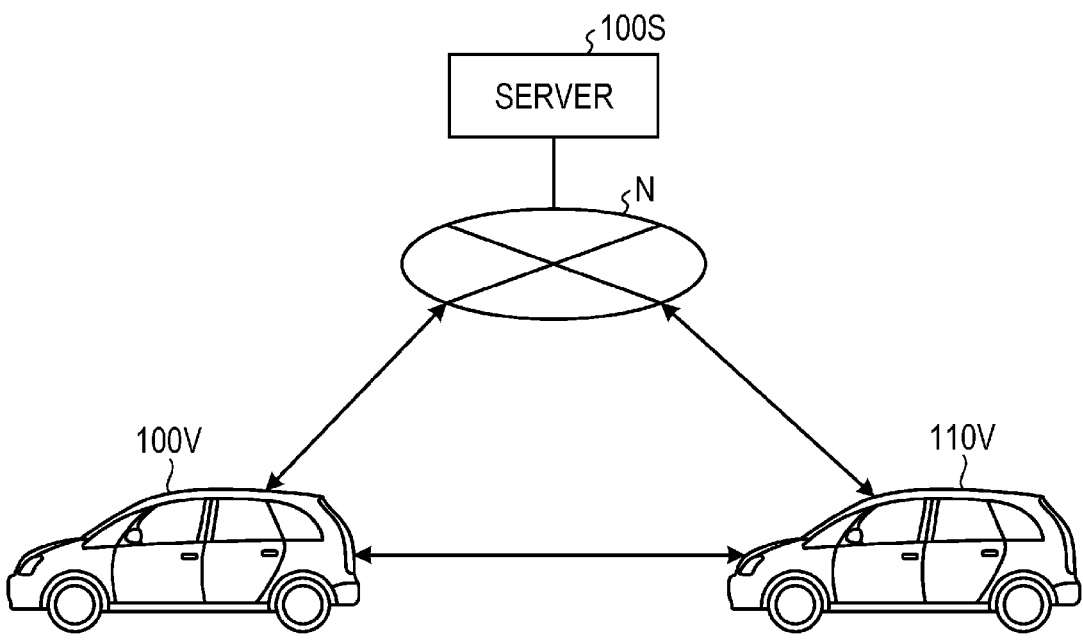
FIG. 34 is a diagram illustrating an example of a configuration of a network system.

The vehicle on which the image processing apparatus is mounted may be connected to a network. FIG. 34 is a diagram illustrating an example of a configuration of a network system. As illustrated in FIG. 34, a vehicle 100V including the image processing apparatus may be connected to another vehicle 110V for data communication. Furthermore, the vehicle 100V may be connected to a server 100S via a network N for communication. The network N is, for example, the Internet. In this case, the image processing apparatus provided in the vehicle 100V can acquire content from the server 100S or the vehicle 110V.

Note that a system including the apparatuses of each of FIGS. 1, 25, and 28 may be achieved as one device. That is, as one embodiment, a device having a function similar to that of at least one of the image display apparatus 40 or the seat setting apparatus 50 in addition to a function similar to that of the image processing apparatus 10 can be achieved. For example, an image processing apparatus having functions similar to those of the image processing apparatus 10a and the seat setting apparatus 50 in FIG. 25 can provide processing equivalent to that by the system including all of the apparatuses in FIG. 25.

Furthermore, the functions of the information processing unit 13 and the display control unit 15 in FIG. 1, 25, or 28 may be provided in a server on a network outside the vehicle, and the vehicle and the server may communicate with each other. In this case, the image display apparatus 40 and the seat setting apparatus 50 may be controlled by the server.

Note that the present technology can also have the following configurations.

(1)

An image processing apparatus including:

a determination unit that determines a screen shape suitable for displaying content on the basis of an automated driving state of a vehicle and information regarding the content to be displayed on a screen provided in the vehicle; and a creation unit that creates an image of the content to be displayed on the screen according to the shape determined to be suitable for displaying the content by the determination unit.

(2)

The image processing apparatus according to (1), in which the determination unit determines the screen shape on the basis of the automated driving state including whether or not the vehicle is driving in an automated manner and an automated driving level.

(3)

The image processing apparatus according to (1) or (2), in which in a case where the automated driving state is a state where the vehicle is driving in an automated manner, the determination unit determines that a shape in which at least one of a plurality of screens is disposed on a windshield of the vehicle is suitable for displaying the content.

(4)

The image processing apparatus according to any one of (1) to (3), in which in a case where the automated driving state is a state where the vehicle is driving in a manual manner, the determination unit determines that a shape in which no screen is disposed on a windshield of the vehicle is suitable for displaying the content.

(5)

The image processing apparatus according to any one of (1) to (4), in which the determination unit determines the screen shape suitable for displaying the content on the basis of the automated driving state, the information regarding the content, and an inclination of a backrest of a seat in the vehicle.

(6)

The image processing apparatus according to any one of (1) to (5), in which in a case where the backrest of the seat in the vehicle is inclined to a degree unsuitable for driving, the determination unit determines that a shape in which the screen is partially disposed on a windshield of the vehicle is suitable for displaying the content.

(7)

The image processing apparatus according to any one of (1) to (4), further including a seat setting unit, in which the determination unit further determines an inclination of the backrest of the seat in the vehicle suitable for displaying the content, and the seat setting unit sets the inclination of the backrest of the seat according to the inclination of the backrest of the seat determined to be suitable for displaying the content by the determination unit.

(8)

The image processing apparatus according to any one of (1) to (7), in which the creation unit creates an image indicating information for assisting driving, as an image to be displayed on a screen disposed on a windshield of the vehicle among a plurality of screens.

(9)

The image processing apparatus according to any one of (1) to (8), in which the creation unit creates an image obtained by capturing an upward side of the vehicle as an image to be displayed on a first screen disposed on a ceiling of the vehicle among a plurality of screens, and an image obtained by capturing a rearward side of the vehicle as an image to be displayed on a second screen disposed on a windshield of the vehicle among the plurality of screens.

(10)

The image processing apparatus according to any one of (1) to (9), in which the creation unit creates an image obtained by capturing a back seat as an image to be displayed on a screen disposed on a windshield of the vehicle among a plurality of screens.

(11)

The image processing apparatus according to any one of (1) to (10), in which the creation unit creates a first image to be displayed on a first screen disposed on a ceiling of the vehicle among a plurality of screens, and a second image for displaying text explaining the first image as an image to be displayed on a second screen disposed on a windshield of the vehicle among the plurality of screens.

(12)

The image processing apparatus according to any one of (1) to (11), in which the creation unit creates an image of an application that is running to be displayed on the first screen disposed on a ceiling of the vehicle and an image of an application launcher to be displayed on the second screen disposed on a windshield of the vehicle.

(13)

A display system including a movable screen provided in a vehicle, a projector, and an image processing apparatus, in which the image processing apparatus includes:

a determination unit that determines a screen shape suitable for displaying content on the basis of an automated driving state of the vehicle and information regarding the content to be displayed on the screen;

a creation unit that creates an image of the content to be displayed on the screen according to the shape determined to be suitable for displaying the content by the determination unit; and a display control apparatus.

(14)

The display system according to (13), further including a seat setting apparatus, in which the determination unit further determines an inclination of a backrest of a seat in the vehicle suitable for displaying the content, and the seat setting apparatus sets the inclination of the backrest of the seat according to the inclination of the backrest of the seat determined to be suitable for displaying the content by the determination unit.

(15)

An image processing method performed by a computer, the image processing method including:

determining a screen shape suitable for displaying content on the basis of an automated driving state of a vehicle and information regarding the content to be displayed on a screen provided in the vehicle; and creating an image of the content to be displayed on the screen according to the shape determined to be suitable for displaying the content.

(16)

A recording medium recording a program for causing a computer to function as:

a determination unit that determines a screen shape suitable for displaying content on the basis of an automated driving state of a vehicle and information regarding the content to be displayed on a screen provided in the vehicle; and a creation unit that creates an image of the content to be displayed on the screen according to the shape determined to be suitable for displaying the content by the determination unit.

REFERENCE SIGNS LIST 10, 10a, 10b Image processing apparatus
11 Input unit
12 Communication unit
13 Information processing unit
14 Shape output unit
15 Display control unit
20 Projector
31 Lower front screen
32 Upper front screen
33 Look-up screen
40 Image display apparatus
50 Seat setting apparatus
151 Content acquisition unit
152 Shape determination unit
153 Image creation unit
154 Shape accumulation unit

The invention claimed is:

1. An image processing apparatus, comprising:

a determination unit configured to:

calculate a degree of inclination of a backrest of a seat in a vehicle;

determine, based on the calculated degree of inclination that is equal to or more than a specific degree of inclination, the calculated degree of inclination is unsuitable for a manual driving operation of the vehicle; and determine a screen shape of a first screen of a plurality of screens of the vehicle to display content in which the first screen and the displayed content overlap with a windshield of the vehicle, wherein the determination of the screen shape is based on an automated driving state of the vehicle, information regarding the content, and the determination that the calculated degree of inclination is unsuitable for the manual driving operation of the vehicle; and a creation unit configured to:

create, based on the determined screen shape, a first image of the content to be displayed on the first screen, wherein the first image of the content includes an application launcher to be displayed on the first screen on the windshield of the vehicle; and create a second image to be displayed on a second screen of the plurality of screens on a ceiling of the vehicle, wherein the second image includes an image of an active application.

2. The image processing apparatus according to claim 1, wherein the determination unit is further configured to determine the screen shape, based on whether the vehicle is driven in an automated manner and an automated driving level.

3. The image processing apparatus according to claim 1, wherein the determination unit is further configured to determine, based on the automated driving state in which the vehicle is driven in an automated manner, that the screen shape in which the first screen is on the windshield of the vehicle is suitable to display the content.

4. The image processing apparatus according to claim 3, further comprising a shape output unit configured to:

control movement of the first screen of the plurality of screens between a housed state and a taken-out state to change an arrangement of the plurality of screens; and change the screen shape based on the change of the arrangement of the plurality of screens.

5. The image processing apparatus according to claim 1, wherein the determination unit is further configured to determine, based on the calculated degree of inclination of the backrest that is unsuitable for the manual driving operation of the vehicle, a specific shape as the screen shape suitable to display the content, and in the specific shape, the first screen partially overlaps the windshield of the vehicle.

6. The image processing apparatus according to claim 1, further comprising a seat setting unit configured to set the degree of inclination of the backrest of the seat.

7. The image processing apparatus according to claim 1, wherein the first image further includes information for driving assistance.

8. The image processing apparatus according to claim 1, wherein the creation unit is further configured to:

create an image of an upward side of the vehicle as the second image to be displayed on the second screen; and create an image of a rearward side of the vehicle as the first image to be displayed on the first screen.

9. The image processing apparatus according to claim 1, wherein the creation unit is further configured to create an image of a back seat as an image to be displayed on a specific screen of the plurality of screens on the windshield of the vehicle.

10. The image processing apparatus according to claim 1, wherein the first image further includes text that explains the first image.

11. A display system, comprising:

a first screen and a second screen in a vehicle;

a projector; and an image processing apparatus that includes:

a determination unit configured to:

calculate a degree of inclination of a backrest of a seat in the vehicle;

determine, based on the calculated degree of inclination that is equal to or more than a specific degree of inclination, the calculated degree of inclination is unsuitable for a manual driving operation of the vehicle; and determine a screen shape of the first screen to display content in which the first screen and the displayed content overlap with a windshield of the vehicle, wherein the determination of the screen shape is based on an automated driving state of the vehicle, information regarding the content, and the determination that the calculated degree of inclination is unsuitable for the manual driving operation of the vehicle; and a creation unit configured to:

create, based on the determined screen shape, a first image of the content to be displayed on the first screen, wherein the first image of the content includes an application launcher to be displayed on the first screen on the windshield of the vehicle; and create a second image to be displayed on the second screen of the plurality of screens on a ceiling of the vehicle, wherein the second image includes an image of an active application.

12. The display system according to claim 11, further comprising a seat setting apparatus configured to set the degree of inclination of the backrest of the seat.

13. An image processing method, comprising:

calculating a degree of inclination of a backrest of a seat in a vehicle;

determining, based on the calculated degree of inclination is equal to or more than a specific degree of inclination, the calculated degree of inclination is unsuitable for manually driving the vehicle;

determining a screen shape of a first screen of the vehicle to display content in which the first screen and the displayed content overlap with a windshield of the vehicle, wherein the determination of the screen shape is based on an automated driving state of the vehicle, information regarding the content, and the determination that the calculated degree of inclination is unsuitable for manually driving the vehicle;

creating, based on the determined screen shape, a first image of the content to be displayed on the first screen, wherein the first image of the content includes an application launcher to be displayed on the first screen on the windshield of the vehicle; and creating a second image to be displayed on a second screen of the plurality of screens on a ceiling of the vehicle, wherein the second image includes an image of an active application.

14. A non-transitory computer-readable medium having stored thereon, computer-executable instructions which, when executed by a computer, cause the computer to execute operations, the operations comprising:

calculating a degree of inclination of a backrest of a seat in a vehicle;

determining, based on the calculated degree of inclination is equal to or more than a specific degree of inclination, the calculated degree of inclination is unsuitable for manually driving the vehicle;

determining a screen shape of a first screen of the vehicle to display content in which the first screen and the displayed content overlap with a windshield of the vehicle, wherein the determination of the screen shape is based on an automated driving state of the vehicle, information regarding the content, and the determination that the calculated degree of inclination is unsuitable for manually driving the vehicle;

creating, based on the determined screen shape, a first image of the content to be displayed on the first screen, wherein the first image of the content includes an application launcher to be displayed on the first screen on the windshield of the vehicle; and creating a second image to be displayed on a second screen of the plurality of screens on a ceiling of the vehicle, wherein the second image includes an image of an active application.

\* \* \* \* \*